US009671529B2

(12) United States Patent
Sakoske et al.

(10) Patent No.: US 9,671,529 B2
(45) Date of Patent: Jun. 6, 2017

(54) LIGHT INFLUENCING NANO LAYER

(71) Applicant: FERRO CORPORATION, Mayfield Heights, OH (US)

(72) Inventors: George E. Sakoske, Independence, OH (US); Enos A. Axtell, III, Seven Hills, OH (US); James D. Walker, Chagrin Falls, OH (US)

(73) Assignee: Ferro Corporation, Mayfield Heights, OH (US)

( * ) Notice: Subject to any disclaimer, the term of this patent is extended or adjusted under 35 U.S.C. 154(b) by 0 days.

(21) Appl. No.: 14/405,193

(22) PCT Filed: Aug. 1, 2013

(86) PCT No.: PCT/US2013/053117
§ 371 (c)(1),
(2) Date: Dec. 3, 2014

(87) PCT Pub. No.: WO2014/022609
PCT Pub. Date: Feb. 6, 2014

(65) Prior Publication Data
US 2015/0177426 A1    Jun. 25, 2015

Related U.S. Application Data

(60) Provisional application No. 61/678,479, filed on Aug. 1, 2012.

(51) Int. Cl.
G02B 5/02          (2006.01)
C03C 17/00        (2006.01)
(Continued)

(52) U.S. Cl.
CPC .......... *G02B 5/0242* (2013.01); *C03C 17/007* (2013.01); *C03C 17/04* (2013.01);
(Continued)

(58) Field of Classification Search
CPC ............. G02B 1/11–1/118; G02B 5/02; G02B 5/0205; G02B 5/0236; G02B 5/0242;
(Continued)

(56) References Cited

U.S. PATENT DOCUMENTS 4,397,666 A * 8/1983 Mishima ................. C03B 19/12
264/301
4,584,280 A    4/1986 Nanao et al.
(Continued)

FOREIGN PATENT DOCUMENTS

EP     0008215 A2    2/1980
JP     3628802 B2    12/2004
(Continued)

OTHER PUBLICATIONS

Espacenet Bibliographic Data for Japanese Publication No. 2007065232 published Mar. 15, 2007, one page.
(Continued)

*Primary Examiner* — Derek S Chapel
*Assistant Examiner* — Adam W Booher
(74) *Attorney, Agent, or Firm* — Rankin, Hill & Clark LLP

(57) ABSTRACT

The present subject matter provides a transitional layer and related methods, used to increase the transmission or reflection of light between two mediums having different indices of refraction. The transitional layer is disposed between the two mediums and the transmission or reflection of light is increased by the interaction of light with the transitional layer. The transitional layer has light scattering particles dispersed therein, a single-layer gradient index-of-refraction, a multi-layer gradient index-of-refraction, alternating layers of high and low index-of-refraction, or a combination thereof, in order to increase the transmission or reflectance of light between the two mediums.

19 Claims, 7 Drawing Sheets

(51) Int. Cl.
 *C03C 17/04* (2006.01)
 *C03C 17/34* (2006.01)
 *G02B 1/115* (2015.01)

(52) U.S. Cl.
 CPC .......... *C03C 17/3411* (2013.01); *G02B 1/115* (2013.01); *G02B 5/0268* (2013.01); *G02B 5/0278* (2013.01); *C03C 2217/452* (2013.01); *C03C 2217/77* (2013.01)

(58) Field of Classification Search
 CPC .. G02B 5/0268; G02B 5/0273; G02B 5/0278; G02B 5/0294; B32B 9/04; B32B 9/041; B32B 9/048; B32B 2264/102; H01L 21/00; H01L 21/02104–21/02112; H01L 21/02123–21/02131; H01L 21/02142–21/02164; H01L 21/02172–21/02197; H01L 21/0223; H01L 21/02255; H01L 21/02269; H01L 21/02282; H01L 21/02288; H01L 21/06; H01L 21/16; H01L 21/20; C03C 17/006; C03C 17/007; C03C 17/02; C03C 17/04; C03C 17/34; C03C 17/3411; C03C 17/3417; C03C 17/3423; C03C 17/3435; C03C 2217/21; C03C 2217/211; C03C 2217/214; C03C 2217/216; C03C 2217/228; C03C 2217/229; C03C 2217/23; C03C 2217/24; C03C 2217/43; C03C 2217/44; C03C 2217/45; C03C 2217/452; C03C 2217/70; C03C 2217/77; C03C 2217/775
 See application file for complete search history.

(56) References Cited

U.S. PATENT DOCUMENTS

| | | | |
|---|---|---|---|
| 4,805,989 A * | 2/1989 | Nakajima | B60R 1/083 359/359 |
| 4,830,879 A * | 5/1989 | Debsikdar | B05D 5/061 136/256 |
| 5,190,807 A * | 3/1993 | Kimock | C23C 16/006 428/216 |
| 5,403,368 A * | 4/1995 | Takahashi | C03C 1/008 427/165 |
| 6,399,689 B1 * | 6/2002 | Scarlette | C08K 3/22 524/430 |
| 6,479,316 B1 | 11/2002 | Hanoka et al. | |
| 7,872,414 B2 | 1/2011 | Sugita et al. | |
| 7,999,283 B2 | 8/2011 | Chakraborty et al. | |
| 2003/0129315 A1 | 7/2003 | Suyal et al. | |
| 2004/0258929 A1 | 12/2004 | Glaubitt et al. | |
| 2005/0069718 A1 * | 3/2005 | Voss-Kehl | B82Y 30/00 428/447 |
| 2005/0106333 A1 | 5/2005 | Lehmann et al. | |
| 2006/0099328 A1 | 5/2006 | Waite et al. | |
| 2007/0116966 A1 | 5/2007 | Mellott et al. | |
| 2009/0263648 A1 | 10/2009 | Saitoh et al. | |
| 2011/0052815 A1 | 3/2011 | Fritsche et al. | |
| 2011/0168261 A1 * | 7/2011 | Welser | G02B 1/115 136/259 |
| 2011/0209752 A1 | 9/2011 | Kohnke et al. | |
| 2011/0212824 A1 | 9/2011 | Almoric et al. | |
| 2012/0288991 A1 * | 11/2012 | Abed | H01B 1/02 438/98 |
| 2013/0196139 A1 * | 8/2013 | Lewis | C03C 17/007 428/312.6 |
| 2014/0009834 A1 * | 1/2014 | Kalyankar | G02B 1/115 359/586 |

FOREIGN PATENT DOCUMENTS

| | | |
|---|---|---|
| JP | 2007-65232 | 3/2007 |
| WO | 2010/027253 A2 | 3/2010 |
| WO | 2010/030591 A2 | 3/2010 |
| WO | 2011/062857 A2 | 5/2011 |

OTHER PUBLICATIONS

International Search Report for corresponding PCT/US2013/053117 mailed Nov. 28, 2013, three pages.

Neophytou et al. "Inkjet-printed polymer-fullerene blends for organic electronic applications," Microelectronic Engineering 95 (2012) pp. 102-106.

Machine translation of JP 3628802 (JPH09295835) published Dec. 17, 2004, 24 pages.

* cited by examiner

LIGHT INFLUENCING NANO LAYER

CROSS-REFERENCE TO RELATED APPLICATIONS

The present application claims benefit from U.S. Provision Patent Application Ser. No. 61/678,479 filed Aug. 1, 2012 which is incorporated herein by reference.

FIELD

The present subject matter relates to a light influencing nano layer, hereinafter referred to as a "transitional layer", disposed between two mediums having different indices of refraction. The transitional layer is used to increase the transmission of light between the two mediums, or in the alternative depending on the desired affect, increase the reflectance of light between the two mediums. The transitional layer includes light scattering particles in a matrix, a single layer or multi-layer gradient index of refraction, or a combination thereof in order to more efficiently influence light transmission or reflection between the two mediums. The present subject matter also includes related methods of making the transitional layer and methods using the transitional layer for increasing the transmission or reflection of light.

As will be realized, the present subject matter is capable of other and different embodiments and its several details are capable of modifications in various respects, all without departing from the present subject matter. Accordingly, the drawings and description are to be regarded as illustrative and not restrictive.

BACKGROUND

As light propagates through a first transparent material having a first index of refraction and reaches an interface with a second transparent material having a second index of refraction, a portion of the light is transmitted through the interface and into the second material while a portion of the light is reflected away from the interface and back into the first material. The closer the angle of propagation of incident light is to the normal angle (i.e. perpendicular to the interface), the more light is transmitted through the interface and the less amount of light is reflected by the interface. As the angle of incident light deviates from normal, at some point it will reach an angle called the critical angle where all of the light is reflected back into the first material and none is transmitted through the interface and into the second material. This phenomenon is called total reflection, and is dependent, in part, on the difference between the refractive indices of the two materials. Where the refractive index difference between the two materials is great, the critical angle will be relatively small. Where the refractive index difference is small, the critical angle will be relatively large.

Various methods have been used to increase the transmission or reflectance of light between two mediums having different indices of refraction, including the use of reflective or anti-reflective coatings and similar methods.

Many processes exist for depositing thin films of materials on substrates for these purposes. One such process involves chemical vapor deposition of various species, such as metals and metal oxides. Other deposition methods include plasma spraying and combustion chemical vapor deposition. These methods make use of precursors that can be vaporized and then deposited on a substrate by some means such as decomposition on a hot substrate or deposition on a charged substrate.

The drawbacks to these methods are that they are expensive and occasionally poisonous starting materials are used. In many instances, the starting materials are air sensitive and must be handled under an inert atmosphere. An additional drawback of such methods is that the substrate for the deposition of the coating must often be placed under a vacuum, increasing the cost of the deposition and limiting the size of the substrate that can be treated.

Screen-printing techniques are also used to deposit modifying surface layers onto various substrates. Examples where screen-printing techniques can be used to deposit opaque layers on a substrate include the printing of black enamels onto automotive windshields, the printing of silver de-frost lines on the rear window (backlight) of automobiles, and the printing of precious metal preparations to decorate dinnerware. Screen-printing techniques can also be used for the manufacture of decals that can be later applied to glass or ceramic substrates, or printing enamels on large panes of glass for architectural applications. Although screen-printing techniques are well adapted for depositing layers on a substrate, they conventionally have the goal of depositing an opaque layer to give color or decorative effects.

Other coating methods useful for the deposition of opaque layers on the surface of a substrate are roll coating, curtain coating, band coating and spray coating techniques. These techniques can be used to apply coatings to glass and ceramic substrates, especially in the architectural and container glass markets.

Another coating technique used to apply metal oxide coatings is the sol gel process. In this method, metal salts such as nitrates, are dissolved into solutions. Water is used as a convenient solvent for such solutions. Complex-forming agents, such as organic acids, are added to the solutions. The water is dried from the solution to create a gel and the gel is then fired. The organic acid and the nitrate salt combust during the firing process to leave the oxide behind. In sol gel reactions, the metal atoms are mixed on an atomic scale and combustion occurs between the nitrate anions and the citric acid. The temperature needed for synthesis of a powder is therefore significantly less than that needed for a traditional solid-state reaction.

One example of the sol gel process includes the fusing of blue cobalt aluminate coatings to a silica glass. The gel is formed from aluminum nitrate, cobalt nitrate, and citric acid. All three starting materials are dissolved in water. The water solution is dried on the glass substrate and the substrate is fired to give a blue coating. To verify the identity of the powder, a portion of the gel can be dried and the powder heated under air in a differential scanning calorimeter. A small exothermic peak at 704° Celsius will indicate that cobalt aluminate is formed.

SUMMARY

The difficulties and drawbacks associated with previously known anti-reflective and reflective coatings as means and strategies to increase, or decrease, the transmission of light between two mediums and related coating techniques, are overcome in the present transitional layer and related combinations and methods.

The present subject matter relates to a transitional layer disposed between two mediums having different indices of refraction.

Most transparent mediums have refractive indices for visible light between 1 and 2. Gases at atmospheric pressure have refractive indices close to 1 because of their low density. Most plastics have refractive indices in the range from about 1.3 to about 1.7. Most glasses have refractive indices in the range from about 1.5 to about 1.9. Transparent ceramic typically can have refractive indices that range from about 1.5 to about 2.1 for visible light. Therefore, in one embodiment, the present subject matter provides a transitional layer with an adjustable index of refraction between that of a first medium and that of a second medium. Often, the first medium is glass and the second medium is air, but alternatively the second medium could be different transparent layers in an OLED device or photovoltaic cells for example. In regard to the current specification, glass and air are used in describing the two mediums between which the transitional layer is disposed. It will be understood that the descpritions herein of the transitional layer are not limited to applications between only glass and air, but can be applied to between other mediums. In any event, the transitional layer applied by methods of the present subject matter provides, in one embodiment, an index of refraction that falls between the index of refraction for both mediums in order to more efficiently transfer light between the mediums with less reflection loss. In another embodiment, the transitional layer provides increased reflection between the two mediums.

In accordance with the present subject matter, a precursor paste is formulated to be applied to a transparent substrate and that when processed, provides a heat-stable transitional layer with adjustable refractive index. By heat-stable, it is meant a coating that can be subjected to subsequent heating temperatures up to about 500° F. or about 260° C. This is opposed to organic coatings that will begin to burn away at those elevated temperatures. Coatings with the proper refractive index are useful for either reducing or increasing the transmission between two dissimilar mediums.

In one aspect, the present subject matter provides a composition for increasing the transmission of light between two mediums having different indices of refraction. The composition is disposed between the two mediums and the light is transmitted through the composition. The composition comprises a matrix having a first index of refraction, and scattering particles having a second index of refraction not equal to the first index of refraction. The scattering particles are dispersed in the matrix and scatter a portion of the light transmitted through the composition to thereby increase the transmission of light between the two mediums.

In another aspect, the present subject matter provides a method of forming a transitional layer used to increase the transmission of light between two mediums having different indices of refraction. The transitional layer is disposed between the two mediums and the light is transmitted through the transition layer. The method comprises disposing a composition between the two mediums; and processing the composition to form the transitional layer. The transitional layer comprises scattering particles having a first index of refraction dispersed in a matrix having a second index of refraction not equal to the first index of refraction. A portion of the light transmitted through the transitional layer is scattered by the scattering particles to thereby increase the transmission of light between the two mediums.

In still another aspect, the present subject matter provides a method for increasing the transmission of light between two mediums having different indices of refraction. The method comprises providing a transitional layer comprising scattering particles having a first index of refraction dispersed in a matrix having a second index of refraction not equal to the first index of refraction. The method includes positioning the transitional layer between the two mediums and transmitting the light through the transitional layer. The scattering particles scatter a portion of the light transmitted through the transitional layer to thereby increase the transmission of light between the two mediums.

In yet another aspect, the present subject matter provides a composition for increasing the transmission of light between a first medium having a first index of refraction and a second medium having a second index of refraction that is different from the first index of refraction. The composition is disposed between the two mediums and the transmission of light is increased by transmitting the light through a thickness of the composition. The composition comprises a single layer comprising a plurality of transparent metal-oxides, the layer having a gradient index of refraction through a thickness of the layer. The gradient index of refraction extends from a portion of the layer closest to the first medium to a portion of the layer closest to the second medium In still another aspect, the present subject matter provides a method of forming a transitional layer used to increase the transmission of light between a first medium having a first index of refraction and a second medium having a second index of refraction that is different from the first index of refraction. The transitional layer is a single layer and is disposed between the first medium and the second medium. The transmission of light is increased by transmitting the light through a thickness of the transitional layer. The method comprises disposing a composition between the first medium and second medium and processing the composition to form the transitional layer. The transitional layer comprises a plurality of transparent metal-oxides that have a gradient index of refraction through a thickness of the transitional layer. The gradient index of refraction extends from a portion of the transitional layer closest to the first medium to a portion of the transitional layer closest to the second medium.

In another aspect, the present subject matter provides a method of forming a transitional layer used to increase the transmission of light between a first medium having a first index of refraction and a second medium having a second index of refraction that is different from the first index of refraction. The transitional layer is a single layer and is disposed between the first medium and the second medium and the transmission of light is increased by transmitting the light through a thickness of the transitional layer. The method includes disposing a composition between the first medium and second medium; and processing the composition to form the transitional layer comprising a plurality of transparent metal-oxides that produce a gradient index of refraction through a thickness of the transitional layer from a portion of the transitional layer closest to the first medium to a portion of the transitional layer closest to the second medium.

In another aspect, the present subject matter provides a method of forming a transparent light extracting transitional layer with selectable index of refraction on a substrate. The method comprises providing a substrate, a soluble metal complex, a complex-forming agent, a resin, and a solvent capable of dissolving the soluble metal complex and the resin. The method also includes dissolving the soluble metal complex, the one complex-forming agent, and the resin in the solvent to form a metal oxide precursor paste. The method includes depositing the metal oxide precursor paste on the substrate. The method includes heating the metal oxide precursor paste to a temperature and for a duration sufficient to burn off the solvent and the resin and oxidize the soluble metal complex to thereby form a transparent transitional layer of metal oxide on the substrate. The transitional layer has an index of refraction between that of the substrate and that of air.

In still another aspect, the present subject matter provides a method of forming transparent light extracting layers with selectable indices of refraction on a substrate. The method comprises providing a substrate, a plurality of soluble metal complexes, a resin, a complex-forming agent, and a solvent. The method includes dissolving one of the plurality of soluble metal complexes, the complex-forming agent, and the resin in the solvent, to form a metal oxide precursor paste. The method comprises depositing the metal oxide precursor paste over the substrate. The method further includes heating the metal oxide precursor paste to a temperature and for a duration sufficient to burn off the solvent and the resin and oxidize the one of the plurality of soluble metal complexes to thereby form a layer comprising a transparent layer of one metal oxide over the substrate with an index of refraction between that of the substrate and that of air. The method includes repeating the dissolving, depositing, and heating steps for a remainder of the plurality of soluble metal complexes until the remainder has been exhausted; wherein the layers are situation on top of one another and have decreasing index of refraction values going away from the substrate.

In still another aspect, the present subject matter provides a method of forming light reflecting layers with selectable indices of refraction on a substrate, the method comprises providing a substrate, a plurality of soluble metal complexes, a resin, a complex-forming agent, and a solvent. The method includes dissolving one of the plurality of soluble metal complexes, the complex-forming agent, and the resin in the solvent, to form a metal oxide precursor paste. The method includes depositing the metal oxide precursor paste over the substrate. The method includes heating the metal oxide precursor paste to a temperature and for a duration sufficient to burn off the solvent and the resin and oxidize the one of the plurality of soluble metal complexes, to thereby form a layer comprising a transparent layer of one metal oxide over the substrate with an index of refraction between that of the substrate and that of air. The method further includes repeating the dissolving, depositing, and heating steps for a remainder of the plurality of soluble metal complexes until the remainder has been exhausted, wherein the layers are situation on top of one another and have alternating higher an lower index of refraction values.

The present subject matter provides, depending on desired intent, an increase in the transmission or reflectance of light between two materials having different indices of refraction. The transitional layer of the present subject matter reduces the reflection loss at an interface of the two materials due to the bridging the difference in the indices of refraction between the two mediums. The transitional layer reduces the reflection loss at such interface. Alternatively, the transitional layer can increase the reflection between the two mediums.

As used herein, the terms "transparent" or "transparency", refer to a medium, layer, substance, material or the like, that is not opaque. Transparent mediums appear clear and do not appreciably scatter light rays transmitted therethrough. "Substantially transparent" materials in accordance with the present subject matter can include partially translucent material. That is, the material may appear slightly hazy or of low clarity, indicating that it is partially scattering light rays transmitted therethrough but is not opaque. The values of "% Transmission", "% Haze", and "% Clarity" are used to characterize the present subject matter coatings.

% Transmission is measured by the percentage of light that travels through the coating. The % Transmission of a material is determined by the amount of transmitted light measured from all angles by an integrating sphere, and the transmitted amount is compared to a reference beam. Ideally, the % Transmission for the instant coatings is a high value. For un-coated microscope slides, the transmittance is approximately 93%.

% Haze is defined as the percentage of the light that is scattered at angles above 2.5° from the incident beam. For un-coated microscope slides, the haze is usually <0.5%. Ideally for a scattering coating of the present subject matter, the % Haze should be high while maintaining high % Transmission.

% Clarity is defined as the amount of scattering that occurs at angles less than 2.5° from the incident beam. For un-coated microscope slides, the % Clarity is generally 100% for bare glass. Ideally, scattering coatings of the present subject matter will have % Clarity values>50%.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

These, as well as other features, aspects, and advantages of the present subject matter will be more completely understood and appreciated by referring to the following more detailed description of the exemplary embodiments of the present subject matter in conjunction with the accompanying drawings.

DETAILED DESCRIPTION OF THE EMBODIMENTS

Figure 1:
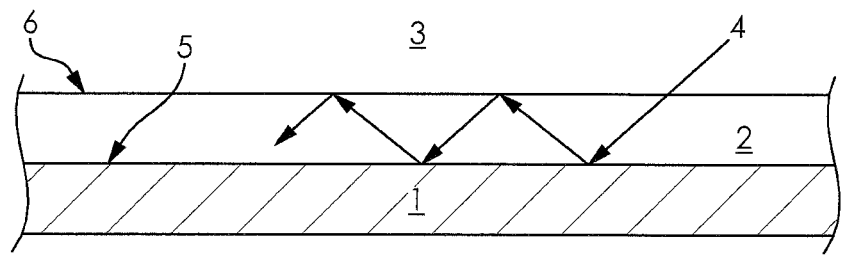
FIG. 1 is a schematic cross-sectional view of two mediums having an interface and showing an example of total internal reflection of light.

One aspect of total internal reflection is represented schematically in FIG. 1. FIG. 1 shows total reflection that takes place wholly within a medium, transmitting the light through a length of the medium rather than through a thickness of the medium. Shown in FIG. 1 is a ray of light 4 propagating in air 3 at an angle equal to or more than the critical angle. The light travels through an air/coating interface 6 and enters into a transparent coating 2 on a transparent substrate 1. When the ray of light 4 meets the coating/substrate interface 5, it is totally reflected, or substantially so, within the coating and back toward the air/coating interface. This total reflection at the coating/substrate interface is due to a large difference in the refractive index between the coating 2 and the substrate 1. When the light reaches the air/coating interface 6, it is totally reflected again, and so on internally in the coating 2. This phenomenon is called total internal reflection, and the result is that the light is "wave-guided" through the length of the coating, with only a small fraction, if any, escaping form the coating through either the coating/substrate interface or the air/coating interface.

The transmission of light through the interface of two adjoined transparent materials having different indices of refraction would be more efficient if the wave-guiding effect and other partial or total reflection could be eliminated or reduced. To achieve this end, and in accordance with one embodiment of the present subject matter, a transitional layer that increases light transmission is situated between the two transparent materials or mediums.

In one aspect, the transitional layer is in contact with, or is adjoined to, at least one of the mediums. That is, the transitional layer is not separated from the medium to which it is adjoined. In another aspect, the transitional layer can be combined with one or more other layers, and be situated in between the two mediums, wherein the transitional layer does not come into contact with one or both of the two mediums yet still is situated between the two mediums.

Additionally, it is to be understood that the transitional layer, alone or in combination with other layers, does not necessarily totally separate the two mediums. In other words, the transitional layer is either situated between at least a portion of each of the two mediums, between the entirety of each of the two mediums, or variations thereof.

Transitional layers of the present subject matter are not limited to the configuration as depicted in FIG. 1 of a coating layer 2 on a substrate 1 and separating the substrate from air 3, but can embody any layer or coating situated between two transparent mediums or material that possess different indices of refraction. For example, the transitional layer can be a layer separating two fluids (i.e., liquid or gas), a layer separating two solids, or a combination thereof. Certain devices, for example such as LED's and OLED's, cold mirrors for telescopes, anti-bird-collision coatings for architectural glass, "low-e" coatings for glass, televisions, solar cells, light fixtures, mobile devices such as cell phone glass, structural glass, automotive and other transportation glass, etc., can benefit from light influencing layers of the present subject matter.

In one embodiment, the transitional layer contains scattering particles to increase the transmission of light between the two mediums. In another embodiment, the transitional layer has a single layer or multi-layer gradient index-of-refraction coatings to increase the transmission of light between the two mediums. In yet another embodiment, the transitional layer is a multi-layered coating of alternating high and low index-of-refraction layers useful increasing the reflection of light from the surface. In still another embodiment, the transitional layer has a combination of scattering particles and a gradient index of refraction to increase the transmission of light between the two mediums. In accordance with the present subject matter, the transitional layer can either increase transmission or reflection of light between the two mediums, as discussed in more detail herein.

Scattering Particles

In one embodiment, scattering particles are incorporated into or on the transitional layer in order to more efficiently transmit light from one material to another.

Figure 2:
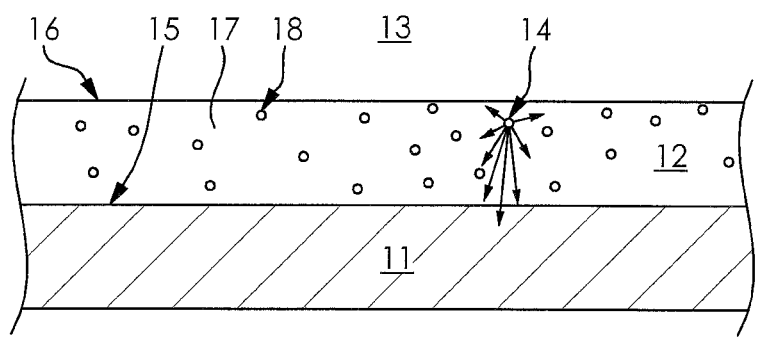
FIG. 2 is a schematic cross-sectional view of a substrate coated with a single layer. The layer consists of a glassy matrix containing scattering particles.

Now referring to FIG. 2 for a non-limiting example of this embodiment, a transitional layer 12 is depicted and embodied by a coating on a substrate 11 (first medium) that separates the substrate from air 13 (second medium). A light ray 14, representing only a portion of the light propagating through the transitional layer, is shown to pass through the air/coating interface 16 and enter into the coating layer 12. The coating layer comprises a matrix 17 containing scattering particles 18 dispersed therein. The ray passes through the matrix until the light encounters the scattering particles. It will be understood that only a portion of the light propagating through the transitional layer will be scattered by the particles therein.

In this embodiment, the first medium—the substrate—has a different index of refraction that the second medium—the air—that would normally produce a certain amount of reflection of light at an interface between them. With the transitional layer, this interface is replaced by an air/coating interface and a coating/substrate interface. The additional interface and the coating (with the intermediate index-of-refraction) work to reduce the amount of reflection that would normally occur, absent the use of the transitional layer. In the transitional layer, the scattering particles have a different refractive index than that of the matrix. It is possible that the matrix could have the lower refractive index and the scattering particles could have the higher refractive index, or vice versa. This difference in refractive index between the matrix and the scattering particles causes a portion of light propagating through the transitional layer to be scattered by the particles and in all directions.

In one aspect, the light scattered by the particles undergoes Mie scattering. The light can be partially Mie scattered, substantially Mie scattered, or totally Mie scattered. In this scenario, and again in reference to FIG. 2, where Mie scattering in substantial/predominant, the light scatters with more intensity in a forward direction in relation to the angle of incident light and towards the substrate 11. Correspondingly, the light scatters with less intensity in a backward direction in relation to the angle of incident light and towards the air 13. Without the presence of light scattering particles, light rays traveling through the coating at angles equal to or more than the critical angle will typically be totally internally reflected in the coating layer and be wave guided therethrough. In contrast, Mie scattering allows for a significant portion of the light to be scattered at an incident angle less than the critical angle. As this portion of the Mie scattered light approaches the substrate at less than the critical angle, it will be able to escape through the coating/substrate interface 15 and into the substrate without being wave guided through the length of the coating.

Other incident light rays (i.e. light rays that propagate through the coating at less than the critical angle and more than the normal angle) will normally be partially transmitted through the coating/substrate interface and into the substrate, and partially reflected at the coating/substrate interface and back into the coating layer. Mie scattering by the scattering particles will also affect this incident light to produce a large forward intensity scattering of the light rays, and a small backward intensity scattering of light. In this scenario, the use of the scattering particles of the present subject matter will produce a net increase in light transmission through the interface and less reflection therefrom.

There are several considerations when choosing the appropriate particles for the transitional layer including the size of particles, the shape of particles, the index of refraction of the particles compared to the index of refraction of the matrix, and the volume ratio of particles within the matrix.

Particle Size

When herein referring to "major dimension" of a scattering particle, it is meant a line passing through the particle that will produce the greatest length. When speaking of the size of the scattering particles or particle size, it is meant the average measurement of the major dimension of all the particles included in or on the matrix.

Where particle size is less than 0.1 times the wavelength of light being transmitted through the transitional layer, Rayleigh scattering of the light predominantly occurs. Rayleigh scattering of light is strongly wavelength dependent, wherein only short wavelengths of the light are scattered. Additionally, Rayleigh scattering does not exhibit a strong forward intensity as does Mie scattering. Rather, Rayleigh scattering exhibits a substantially equal forward and backward intensity.

As particle size transitions from 0.1 times to 1 times the wavelength of light, scattering transitions from Rayleigh to Mie scattering. Particles with a size larger than 1 times the wavelength of light substantially produce only Mie scattering. In one aspect, the transitional layer and particles produce substantially only Mie scattering of the light.

In regard to size and in accordance with the present subject matter, the particles used in the transitional layer in one embodiment are from about 0.1 to about 10 times the wavelength of light that will be transmitted through the transitional layer. In one aspect where visible light (having a wavelength from about 380 nm to about 740 nm) will be transmitted through the transitional layer, the size of the scattering particles therein range from about 38 nm to about 7400 nm.

In another embodiment, the particles are from about 0.1 to about 1 times the wavelength of light that will be transmitted through the transitional layer. In one aspect of this embodiment, where visible light will be transmitted through the transitional layer, the size of the particles range from about 38 nm to about 74 nm.

In another embodiment, the particles are from about 1 to about 10 times the wavelength of light that will be transmitted through the transitional layer. In one aspect of this embodiment, where visible light will be transmitted through the transitional layer, the size of the particles range from about 380 nm to about 7400 nm.

In still another embodiment, the particles are from about 1 to about 2 times the wavelength of light that will be transmitted through the transitional layer. In one aspect of this embodiment, where visible light will be transmitted through the transitional layer, the size of the particles range from about 380 nm to about 1480 nm.

In all embodiments, it will be understood that the form and wavelength of the electromagnetic radiation transmitted through the transitional layer can vary and can include ultraviolet radiation and infrared radiation, for example. In these cases, the size in nanometers of the particles will be different than those stated herein but the ratio of particle size to wavelength will be maintained.

Particle Shape

The shape of the particles will affect the amount and intensity light scattering. The shape of the particles is not particularly limited. It is understood that particles of any shape can produce light scattering and Mie scattering in particular. While not being bound to any particular theory, it is believed that spherically shaped particles exhibit greater efficiency and more intense Mie scattering of light in a forward direction. In one aspect, the scattering particles are spherically shaped, or substantially so. In another aspect, the particles are not substantially spherically shaped (i.e. needle-shaped or tabular in form).

Particle Refractive Index

The index of refraction of the scattering particles compared to the index of refraction of the matrix in which the particles are contained will affect the scattering of light by the particles. The index of refraction of the particles can be greater than the matrix, or vice versa, as long as the indices are different. A relatively large difference in the indices of refraction between that of the particles and that of the matrix will produce relatively more scattering of light. A relatively smaller difference in the indices of refraction between that of the particles and that of the matrix will produce relatively less scattering of light. In one embodiment, the index of refraction of the particles is less than the index of refraction of the matrix in which the particles are contained. In another embodiment, the index of refraction of the particles is more than the index of refraction of the matrix in which the particles are contained.

Particle Concentration

The volume percentage of scattering particles compared to the total volume of the transitional layer (i.e. matrix and particles combined) will affect light scattering and the transmission efficiency for light passing through the transitional layer.

When the volume percentage (i.e. concentration) of scattering particles in the matrix is too low, very little light will be scattered by the particles. Without adequate concentration of particles to produce sufficient scattering, light rays propagating at angles equal to or more than the critical angle will not be scattered and will be waveguided through the length of the transitional layer rather than through the thickness of the transitional layer and between the two mediums.

When the volume percentage of scattering particles in the matrix is too high, near-field optical interaction between neighboring particles will become significant and will dramatically negatively impact macroscopic transmission of light through the thickness of the transitional layer. Light rays will potentially be scattered multiple times by numerous particles and the intensity of light ultimately transmitted by the transitional layer will be diminished. The overall transmission efficiency, normally improved by the presence of scattering particles, will be diminished by particle concentration levels that are too high.

In one aspect, the volume percentage of scattering particles compared to the total volume of the transitional layer comprising the matrix and particles is from about 1 to about 20%. In another embodiment, the volume percentage is from about 5 to about 15%. In yet another embodiment, the volume percentage is about 10%.

Particle Dispersion Array

The array of scattering particles within a matrix can also be varied to produce custom scattering effects for a transitional layer. Different arrays can be produced by varying the production techniques for a transitional layer. Several non-limiting examples of particle dispersion arrays within a matrix are shown in FIGS. 3-6.

Figure 3:
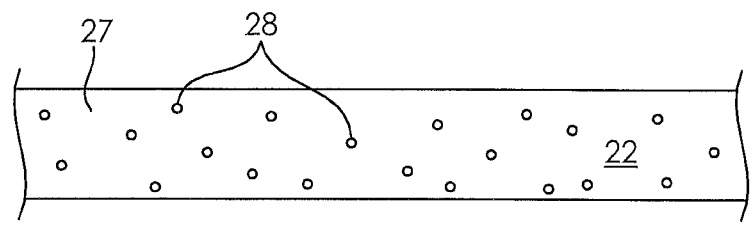
FIG. 3 is a schematic cross-sectional view of a medium having scattering particles dispersed therein.

In one embodiment, the scattering particles are dispersed substantially uniformly in the matrix. This is represented in FIG. 3 where a medium 22 is shown to comprise a matrix 27 having scattering particles 28 dispersed substantially uniformly therein.

Figure 4:
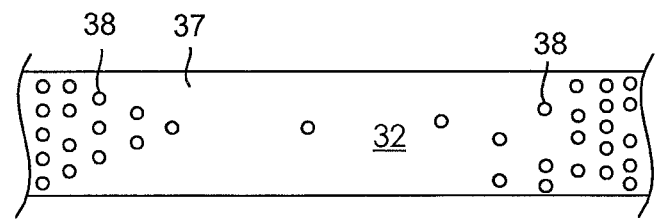
FIG. 4 is a schematic cross-sectional view of another medium having scattering particles dispersed therein.
Figure 5:
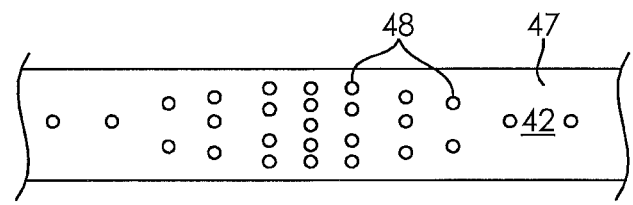
FIG. 5 is a schematic cross-sectional view of another medium having scattering particles dispersed therein.
Figure 6:
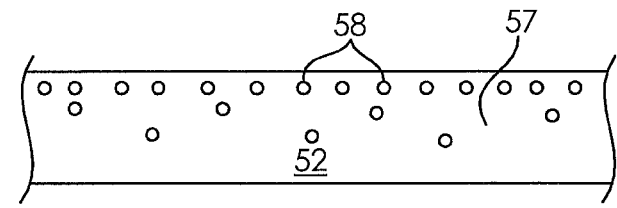
FIG. 6 is a schematic cross-sectional view of another medium having scattering particles dispersed therein.

In another embodiment, the scattering particles are not dispersed substantially uniformly in the matrix. This is represented in FIG. 4-6 where a medium 32, 42, 52, respectively, is shown to comprise a matrix 37, 47, 57, having scattering particles 38, 48, 58, not dispersed substantially uniformly therein.

Other dispersion arrays of scattering particles can be used and implemented in accordance with the present subject matter to more efficiently transmit light between two mediums having different indices of refraction.

Methods of Producing Transitional Layers Having Scattering Particles

The present subject matter relates to methods of making the transitional layer comprising the scattering particles. In one embodiment, represented for example in FIG. 2, the transitional layer 12 comprises a conventional glass enamel composition applied to a substrate 11. The enamel composition comprises a transparent frit and an organic vehicle for applying the powdered frit to the substrate surface. The glass frit and organic vehicle are not particularly limited and can be formulated for particular needs and particular substrates. The method comprises dispersing the scattering particles 18 in the enamel composition. The enamel composition 12 including the scattering particles, is applied to the surface of a substrate. The substrate is not particularly limited but can comprise glass, ceramic, polymers, or portions of an OLED device as non-limiting examples. By firing the enamel composition with the scattering particles on the substrate, the organic vehicle is burned away and the glass frit melts. After cooling, the melted glass frit solidifies to for a glassy matrix 17 holding the scattering particles 18 dispersed therein, to form a light-transmitting transitional layer between the substrate and air 14 in accordance with the present subject matter.

In another embodiment, a glass frit used to form a glass enamel transitional layer is composed and processed in such a manner that crystalline particles are formed in the enamel during the firing cycle. The crystalline particles formed in the glass enamel act as scattering particles to scatter the light transmitted therethrough. This enamel system comprises glass frit, an organic vehicle, and seed crystal material. The glass frit, organic vehicle, and seed crystal material is not particularly limited and can be formulated for a specific purpose or substrate. The organic vehicle is used as a means to apply the glass frit to the substrate and burned off during the firing cycle. The firing cycle of the enamel composition is adjusted to promote nucleation and growth of crystal particles of certain size from within the enamel composition. The enamel contains a small percent of a seed crystal material in order to enhance the crystallization of the molten frit during firing. Crystal size is controlled, not only by the composition of the glass frit and seed crystal material, but also by the firing parameters such as temperature, heating duration, cooling rate, and the like. The crystals formed in this process have a different index of refraction than the glassy matrix. That is, the crystals have a molecular arrangement that is highly ordered. When compared to the random molecular arrangement of the amorphous glass matrix, the crystals have a higher index of refraction and therefore are able to scatter light entering the transitional layer.

In another embodiment, the transitional coating is provided by dispersing scattering particles with a relatively low index of refraction into an organo-metallic-based paste. The paste comprises one or more metal-oxide precursors and a vehicle that includes one or more solvents and one or more resins. Metal-oxide precursors are materials that dissolve in the solvent to form metal ions in solution. The resins are added to adjust the viscosity of the solution. When fired, the pastes form thin transparent layers of metal-oxides having relatively high indices of refraction. Suitable metal-oxide precursors include metal alkoxides as the solvated metal ion source. Metal methoxides, metal ethoxides, metal isopropoxides, metal butoxides, metal chelates, metal alcoholates, and the like are non-limiting examples of such compounds. These compounds are can be readily dissolved in the solvents. Non-limiting examples of metals used in accordance with the present subject matter to form oxide layers containing scattering particles include B, Al, Si, P, Sc, Ti, Zn, Ga, Ge, As, Y, Zr, Nb, Mo, In, Sn, Sb, La, Hf, Ta and W. In one aspect, the metal complexes used to form metal-oxides layers are those of Si, Ti, Zn, Zr, Nb, Hf, and Ta.

In this embodiment, the paste having scattering particles dispersed therein is applied to the substrate and fired. This process yields a transitional layer comprising a metal-oxide matrix having a high index of refraction with embedded scattering particles having a relatively low index of refraction that are able to scatter light. In one aspect, the metal-oxide matrix has a high (~2) refractive index while the scattering particles have a lower index of refraction. It is also contemplated that in another aspect, the organo-metallic based pastes are seeded as well, to provide crytallized scattering particles in the fired coating.

Gradient Index of Refraction Coatings

When light is traveling through one transparent medium (such as air) and meets the interface of another transparent medium (such as glass), a certain percentage of the light is reflected at that air-glass interface. The remaining percentage is transmitted into the glass. The percentage of light reflected and the percentage of light transmitted is related to the difference between the index of refraction of air and the index of refraction of the glass. A coating that increases the transmission of light between the two mediums has an index of refraction between that of air and the glass so that less light is reflected by the air-coating interface and the coating-glass interface combined than the amount of light reflected at the single air-glass interface.

In the alternative, light reflection from a surface can be enhanced by depositing layers with alternating high and low refractive indices. Each iteration of the high index-of-refraction coating is deposited with a layer thickness of approximately ¼ the wavelength of the light it is desired to reflect. The low index-of-refraction layer is deposited with a thicker depth than that of the high index-of-refraction layer. Light being deflected at each interface between the dislike coatings will constructively interfere to cause reflection from the coated surface.

In the case where a transitional layer comprises a single-layer coating, the substrate-air interface is replaced by two interfaces: an air-coating interface and a coating-substrate interface. If the coating has a refractive index between those of the substrate and air, each of these interfaces exhibit less reflection of light than the air-substrate interface. Additionally, the total reflection of the two interfaces is less than the reflection of the air-substrate interface. In another embodiment, the refractive index of the coating is greater than that of the substrate, creating a more reflective surface.

Figure 9:
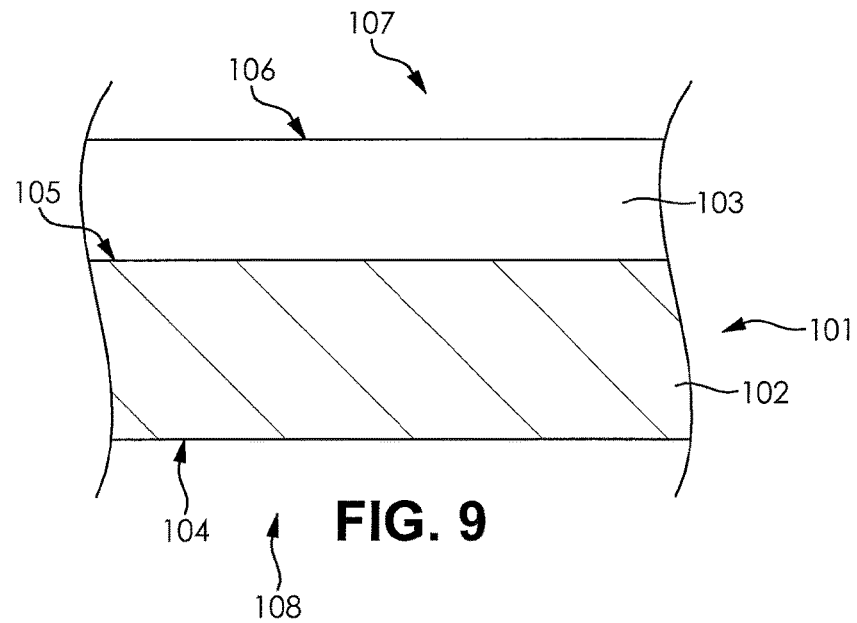
FIG. 9 is a schematic cross-sectional view of a substrate coated with a transitional layer comprising a single-layer.

Referring to FIG. 9, represented is a coated substrate 101 with a transitional layer 103 that increase the transmission of light, the transitional layer coating formed by a method in accordance with the present subject matter. Depicted is an adjustable refractive index transitional layer coating 103 that has been applied to the substrate 102 and fired. Also referenced in FIG. 9 is a substrate-air interface 104, a substrate-coating interface 105, and a coating-air interface 106.

As light passes through the substrate 101 from the coating side 107, the light passes through the coating-air interface 106 into the transitional layer 103. The light then travels through the substrate-coating interface 105 and into the substrate 102. The light then travels through the substrate-air interface 104, leaving the coated substrate 101 to the substrate side 108. Light is more efficiently transferred through the coated substrate 101 in this direction when the refractive index of the transitional layer 103 is intermediate between that of the substrate 102 and that of the surrounding air. This is due to lower combined reflection loss at the two interfaces 105, 106 compared to reflection loss if light entering an uncoated substrate.

Again referring to FIG. 9 showing a transitional layer formed by a method in accordance with the present subject matter, depicted is a coated substrate 101 with a transitional layer coating 103 that reflects light. Light is less efficiently transferred through the coated substrate 101 from the coating side 107 when the refractive index of the transitional layer 103 is greater than that of the substrate 102. More light is reflected at the coating-air interface 106 than compared to the reflection loss if light entering an uncoated substrate. The transitional layer 103 with a high index of refraction gives the coated substrate 101 a "partial-mirror" effect. This transitional layer 103 displays reflective properties and can be made as discussed herein.

In one embodiment in accordance with the present subject matter, a transitional layer having a gradient index of refraction is used between two mediums having different indices of refraction. In one aspect, the gradient transitional layer increases the transmission of light therethrough. The gradient index of refraction extends through a thickness of the transitional layer from a portion of the transitional layer closest to a first medium to a portion of the transitional layer closest to a second medium. The use of this transitional layer produces a more efficient transmission of light between the two mediums than would be present without the transitional layer.

The gradient transitional layer has a refractive index that spans the differences between the first medium (for example, air) and the second medium (for example, glass or other substrate) by creating a gradient refractive index coating on the substrate. In one aspect, the transitional layer comprises a "multi-layer coating", wherein the multiple layers having various refractive indices remain distinct layers, meaning the compositions of adjacent layers do not substantially intermix. In another embodiment, the transitional layer comprises a "single layer coating", wherein multiple layers having various refractive indices do not remain distinct layers, but where the compositions of adjacent layers do intermix.

Figure 7:
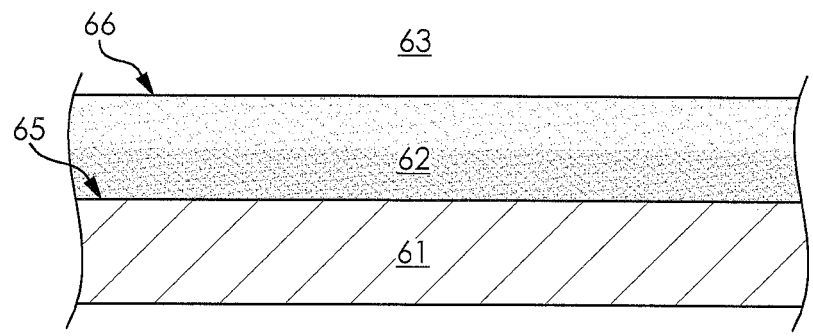
FIG. 7 is a schematic cross-sectional view of a substrate coated a coating possessing a gradient index-of-refraction.
Figure 8:
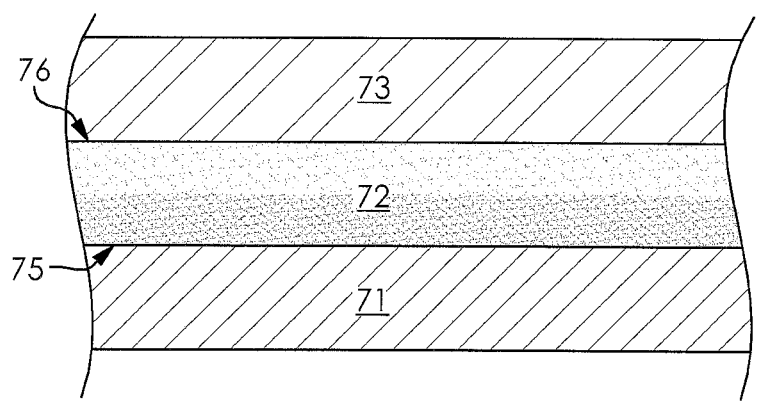
FIG. 8 is a schematic cross-sectional view of a gradient index-of-refraction coating joining two mediums of dissimilar indices of refraction.
Figure 10:
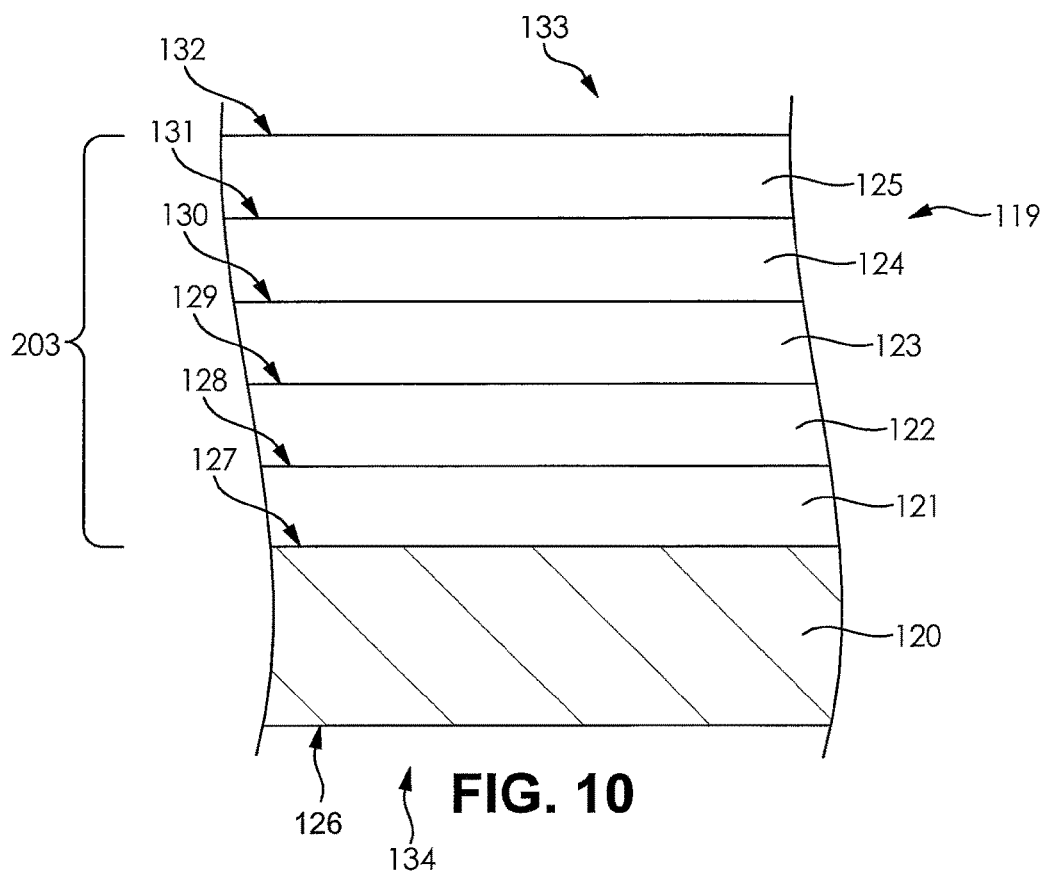
FIG. 10 is schematic cross sectional view of a substrate coated with a transitional layer comprising multiple layers.

The gradient transitional layer is formed by applying multiple layers to a substrate, each with an increasing or decreasing index of refraction, as needed for the application. This is depicted in FIG. 10, where multiple coatings 121-125 forming a transitional layer 203 by methods in accordance with the present subject matter are shown. While FIG. 10 depicts distinct layers, it will be understood that the layers 121-125 may intermix to form a single layer transitional layer as shown in FIG. 7 or 8, or may remain substantially distinct and not substantially intermix to form a multi-layer transitional layer.

In FIG. 10, a coated substrate 119 is represented having a transitional layer 203 made of layers 121, 122, 123, 124, and 125, all with adjustable refractive indices. The layers 121-125 have been sequentially applied to substrate 120 and fired. Each successive layer possess a successively higher or lower refractive index, as needed by the application. Also referenced in FIG. 10 is a substrate-air interface 126, a substrate-coating interface 127, layer-layer interfaces 128, 129, 130, and 131, and a coating-air interface 132.

As light passes through the coated substrate 119 from the coating side 133, the light passes through the coating-air interface 132 into layer 125. The light then travels through the transitional layer 203 by passing through each layer-layer interface 131, 130, 129, 128 and then into each layer 124, 123, 122, and 121 respectively. The light then travels through the substrate-coating interface 127 and into the substrate 120. The light then travels through the substrate-air interface 126, leaving the coated substrate 119 to the substrate side 134. In one embodiment, light is more efficiently transferred through the coated substrate 119 in this direction when the refractive index of each successive layer going from 121 to 125 is intermediate between that of the substrate 120 and that of the surrounding air and also decreases in value. This is due to lower combined reflection loss at the interfaces 127, 128, 129, 130, 131, and 132, compared to reflection loss if light entered an uncoated substrate.

In another embodiment method, if it is desired to increase the reflectivity of the transitional layer, then alternating layers of high refractive index and low refractive index are successively applied and fired. The increased number of interfaces between each additional layer leads to the desired increase in reflectivity. Referring again to FIG. 10, a reflective transitional layer 203 can be formed on substrate 120 with high index-of-refraction layers applied at 121, 123, 125, and low index-of-refraction layers applied at 122, 124, or vise-versa. After the firing of all layers is complete, the coated substrate 119 displays higher reflectivity than a non-coated or even a single-coated substrate.

In other embodiments, a multi-layered coating is formed on a substrate wherein the individual layers have sequentially increasing, sequentially decreasing, sequentially alternating, random, or substantially similar indices of refraction.

Without the use of a gradient transitional layer, there is a large index of refraction difference at the interface between the first and second interface. By using the gradient transitional layer, this single interface is replaced by two interfaces: a first interface between the first medium and the transitional layer, and a second interface between the transitional layer and the second medium. In the case where light transmission is to be enhanced, the difference in the indices of refraction between the two mediums is bridged by the gradient index of refraction of the transitional layer. The index of refraction difference at first and second interfaces is smaller than the index of refraction difference at the single interface between the two mediums without the use of transitional layer. Thus, the reflection at the first and second interface will be collectively smaller than the single interface, and more light will be transmitted between the two mediums.

FIG. 7 is a schematic drawing of such an index of refraction gradient extending within a single layered coating 62 for increasing the % Transmission. The transitional layer 62 separates a substrate 61 from a different medium 63 that has a different index of refraction than the substrate. The coating has a refractive index that gradually changes from the medium/coating interface 66, through the thickness of the coating, and to the coating/substrate interface 65 as illustratively depicted.

In one aspect, the coating possesses an index of refraction at the medium/coating interface that is substantially equal to the index of refraction of the surrounding medium, or as close as possible. As illustratively depicted, the index of refraction of the coating gradually increases or decreases through the thickness of the coating from the medium/coating interface to the coating/substrate interface, until the index of refraction at the coating/substrate interface is substantially equal to the index of refraction of the substrate, or as close as possible.

In another aspect, it will be understood that the medium 64 can be air or other mediums such as other fluids or even solids. In such circumstances, the index of refraction at the medium/coating interface is equal to, or as close as possible to the index of refraction of the substance or material comprising the surrounding medium.

Where, as in FIG. 8, the transitional layer separates and joins two solids, or two liquids, or a solid and a liquid, the gradient transitional layer will also reduce the reflection losses where the two mediums have different refractive indices. In FIG. 8, medium 71 is coated with a gradient coating 72, wherein from interface 75 to interface 76, the refractive index of coating 72 gradually changes from a value near the refractive index of medium 71 to a value near that of medium 73 as illustratively depicted. In one aspect of this embodiment, at least one of 71 or 73 is a solid substrate, so that the coating can be applied and fired to it. When "solid" is referred to herein, it is meant to include glass. In another aspect of this embodiment, the transitional layer 72 lies between two fluid mediums, i.e. gas or liquid.

Methods of a Forming Transitional Layer Having a Gradient Index of Refraction

The type and concentration of metal ions in the precursor paste and the thickness in which the paste is applied will both affect the refractive index of a layer after firing. In a one embodiment method, the precursor paste is applied from about 3 microns to about 100 microns wet thickness. By wet thickness, it is meant the thickness of the paste just after application and before the paste is dried and fired. By wet paste/layer, it is meant the metal oxide precursor paste just after application and before the paste is dried and fired.

By dry paste, it is meant the metal oxide precursor paste after application to the substrate and after the paste has been dried but before firing. Drying causes at least a portion of the solvent to evaporate from the metal oxide precursor paste. This operation allows for handling, movement, or other production steps to be initiated before the firing step, i.e. before the metal ions are oxidized, before the organic components are burned off, and before the a layer of metal oxides form on the substrate. The drying step allows for the paste to retain the printed form or shape on the substrate before firing and upon movement of the substrate. The design on the substrate will be maintained upon movement because the dried paste will not flow from the portion of the substrate to which it was applied. Drying also insures that the solvent will not burn if heated suddenly above its flashpoint or that the solvent will not become trapped in the firing film, thereby causing bubbling or foaming in the transitional layer.

The drying operation comprises heating the paste from about 20° C. to about 300° C. for about 15 seconds to about 60 minutes. The time and temperature used for drying will depend on a number of factors including the physical characteristics of the substrate, the thickness and viscosity of the wet paste, the boiling points of the solvent in the paste, and the like. The drying operation can be accomplished with a belt dryer, drying oven, hotplate, air drying, or the like. This operation can optionally be eliminated and the solvent can be evaporated during the firing step. Elimination of the drying operation may be advantageous to speed up production where excessive handling of the substrates is not a substantial consideration.

By fired thickness, it is meant the thickness of the metal oxide layer formed on the substrate after application, drying, and firing operations. By fired coating/layer, it is meant the metal oxide layer after application, drying, and firing.

Firing or heating the layers in accordance with the present subject matter substantially burns off any solvent, resin, and any other additives in the metal oxide precursor paste that remain after the drying operation. Also, firing of the paste oxidizes at least a portion of the metal ions in solution to form a thin metal oxide coating on the substrate. The metal oxide will coat a portion of the substrate in a thickness that provides a transparent layer with adjustable index of refraction. The fired coatings are heat stable, in that the fired coatings can be subjected to temperatures in air up to about 500° F. or about 260° C. without significantly affecting the coating or the index of refraction of the coating. The thickness of individual fired layers in accordance with the present subject matter is from about 0.01 microns to about 10 microns.

In one aspect, the firing operation comprises heating the paste from about 300° C. to about 1000° C. from about 1 minute to about 60 minutes. This operation can be accomplished in a kiln, an oven, or by other conventional means.

The load of metal oxide precursor in the paste affects the fired thickness of the layer. The higher the load of metal oxide precursor, the thicker the fired layer will be. The load of metal oxide precursor can be increased for the paste while the thickness of the wet layer can be decrease to maintain a desired index of refraction for the layer in a particular application. In a one embodiment, the concentration of metal oxide precursor is from about 0.01 wt % to about 20 wt % of the paste.

Another factor that will affect the refractive index for a transitional layer will be the surface roughness of the fired layer. If the interface of the fired transitional layer with air is relatively smooth, more light will be transmitted through the coating-air interface. If the coating-air interface is relatively rough, more light will be reflected by the interface. In the methods in accordance with the present subject matter, relatively consistent thickness of the fired layers provides a generally uniform transitional layer. In one embodiment the surface roughness, or the difference between the thickest part of the transitional layer to the thinnest part of the transitional layer, is about 0.1 to about 10 nm.

The transitional layer of the present subject matter is made by forming one or more metal oxide precursor pastes. The pastes can comprise at least one soluble metal complex, a resin, and a solvent capable of dissolving the metal complex and the resin. Dissolving can be accomplished by any conventional means including mixing, stirring, heating, agitating, shaking, or the like. The paste may contain a complex-forming agent and one or more optional additives. The precursor paste contains metal ions that are capable of forming metal oxides upon firing. The paste is then deposited on at least a portion of a substrate and dried, pre-heated, and fired, or fired without a pre-heat. Pre-heating the paste includes heating the paste to a temperature and for a duration sufficient to burn off the resin, any remaining solvent, and optional additive. The firing process oxidizes the metal ions in the dried and pre-heated layer to form the final metal oxide layer. The methods are designed to result in continuous, optically transparent, fired films/layers comprising metal oxides with the added property of possessing adjustable refractive indices. The methods optionally include repeating a number of steps to form multiple layers on a substrate as discussed in more detail herein.

Methods carried out in accordance with the present subject matter have the benefit of simple and efficient execution, the methods are able to be used in a number of diverse applications, and the methods can be tailored for application over large substrate areas. In selecting the appropriate soluble metal complex as a component for a metal oxide precursor paste, one can adjust the index of refraction for the coating to suit a particular need. The methods also provide for application and firing of the pastes to be accomplished at atmospheric conditions. The use of vacuum equipment and other expensive procedures is thus eliminated.

Also, by correctly choosing the combination of solvents, resins, and optional additive components, the paste can be formulated for different deposition techniques. Multiple layers of different compositions can also be applied to a substrate to achieve layers with varying indices of refraction to attain enhanced transmission or reflective properties.

In accordance with the present invention, the metal oxide precursor pastes are applied to transparent substrates comprising glass, transparent ceramics, transparent polymers, crystals, and the like. Suitable substrates are not restricted except that they are stable to the firing process. It is also contemplated that opaque substrates can be layered with the pastes of the present subject matter, especially when a partial-reflective transitional layer is desired.

Soluble metal complexes in accordance with the present subject matter are metal compounds that are capable of dissolving in a solvent and upon firing, are capable of forming oxide compound layers on a substrate that are transparent and which possess various indices-of-refraction.

Standard solutions of metal ions are known to be useful for the calibration of instrumentation for various chemical analysis techniques such as flame atomic absorption and inductively coupled plasma experiments. Other known uses for dissolved metal ions are for chemical drying agents and catalysis. Metal solutions are also useful in the area of ceramic decoration known as Luster coatings. Coatings of various colors can be applied to ceramic dinnerware using these coatings. Especially interesting is the use of various metal solutions to change the color of fired films made by printing precious metal containing solutions. Gold-containing coatings can be made to be blue, green, purple and red by changing the metal ions in the coating with the gold. Unfortunately, these materials do not fare well when printed over large areas. The present invention strives to provide a metal oxide precursor paste that will print with few defects over large substrate areas.

In a one embodiment, metal alkoxides are use as the solvated metal ion source. Metal methoxides, metal ethoxides, metal isopropoxides, metal butoxides, metal chelates, metal alcoholates, and the like are non-limiting examples of such compounds. These compounds are can be readily dissolved into the solvents to be described herein. The metal complexes in the present subject matter are those whose oxide compounds are capable of forming a transparent coating on a substrate that possess various indices of refraction. Non-limiting examples of metals to form oxide layers in accordance with the present subject matter include B, Al, Si, P, Sc, Ti, Zn, Ga, Ge, As, Y, Zr, Nb, Mo, In, Sn, Sb, La, Hf, Ta and W. Other suitable metal complexes to form metal oxides layers are those of Si, Ti, Zn, Zr, Nb, Hf and Ta.

The thickness of the fired layer will affect the level of transparency and refractive index of a coating. The fired thickness of a single layer of metal oxide in accordance with the present subject matter is from about 0.01 microns to about 10 microns.

The simplest metal oxide precursor pastes to make are those that contain cations of only one metal. Simple pastes with only a single metal complex can be formulated to known metal cation concentrations to produce multiple stock pastes with known indices of refraction. These single metal oxide precursor stock pastes can be combined together before firing in known concentrations to provide a way to adjust the index of refraction for a single layer. Adjusting the proportions of each stock paste allows one to tailor the resulting index-of-refraction for the single layer upon firing. Alternatively, metal complexes that produce a known index of refraction can be combined in predetermined concentrations in situ to form a single paste that similarly allows for adjustment to the refractive index of the single layer. In either case, the stability of these solutions can be checked over time to determine if there is any precipitation or cloudiness forming which might affect the transparency and uniformity of the resulting fired metal oxide layer. It is also contemplated that the stock pastes or combination pastes can be incorporated to form single or multiple layer substrates as depicted in FIGS. 9 and 10.

The creation of high quality metal oxide films by the liquid application of metal oxide precursors depends on the ability to produce stable solutions of dissolved metal ions. The addition of complex-forming agents can stabilize the metal oxide precursors from prematurely oxidizing before the paste is fired on a film. The addition of complex-forming agents will be discussed in detail herein.

The amount of soluble metal oxides added to the metal oxide precursor pastes to adjust the refractive index of the layer will depend on the application. Suitable amounts of soluble metal oxide(s) in accordance with the present subject matter are from about 0.01 wt % to about 20 wt % of the paste.

Another consideration in the formulation of materials for the instant invention is that the metals involved are oxophilic (oxygen-loving) and that their precursor compounds sometimes need to be protected from unwanted oxidation upon exposure to water or oxygen prior to the processes of application to the substrate surface, drying, and firing.

It is possible to protect the metal complexes from reacting with water and oxygen by using complex-forming agents. Complex-forming agents replace some or all of the existing ligands on the metal complexes to provide metal compounds that are less likely to oxidize in the presence of water or oxygen. Non-limiting examples of suitable complex-forming agents are poly-acrylic acid, oxalic acid, maleic acid, succinic acid, dipropylene glycol, glymes such as proglyme, triglyme and high glyme, 1, 4 butane diol, 1, 3 butane diol, 1, 3 propane diol, pine rosin, citric acid, other natural and artificial organic acids and alcohols, and the like.

It is also possible to buy stable commercial solutions of metal complexes to use in the invention that are protected from reaction with water and oxygen. The products marketed under the name Tyzor supplied by Dorf Ketal Chemicals LLC, 3727 Greenbriar, Suite 114, Stafford, Tex., 77477, USA, are examples of solutions of titanium and zirconium that have been stabilized from reacting with water and oxygen. Complex-forming agents are added to the metal oxide precursor pastes in accordance with the present subject matter in the amount from about 1 wt % to about 15 wt % of the paste. Without the incorporation of complex-forming agents, the metal oxide precursor complex may precipitate or form a powder in the paste before the firing operation. This could lead to a non-uniform fired layer.

In one aspect of the present subject matter, resins are included in the metal oxide precursor pastes. The addition of an amount of resin allows a user to tailor the pastes for a particular deposition technique. To tailor the viscosity of a particular paste and achieve a specific rheometry, different application techniques can then be utilized to apply the paste to a substrate. This component variable is related to the application techniques discussed in further detail herein. The resin will burn off during firing and will not affect the index of refraction for the coating.

In one embodiment, water-soluble resins are used in this regard. Water soluble resins are less harmful to the environment and less toxic upon firing. Unlike resins soluble in organic solvents, water-soluble resins do not release volatiles into the atmosphere upon drying or firing. Suitable water-soluble resins in accordance with the present subject matter are cellulose-based materials such as hydroxypropyl cellulose, wood products such as lignins, long-chain polyols that are solids at room temperature, dextrose, starches and the like. Other suitable water-soluble resins in accordance with the present subject matter are hydroxypropyl cellulose, such as the Klucel line of resins, and long-chain polyols, such as the Carbowax line. It is also contemplated that resins that are soluble in organic solvent can alternatively be used.

Other additions may also include epoxies, polyesters, acrylics, cellulosics, vinyls, natural proteins, styrenes, polyalkyls, carbonates, rosins, rosin esters, alkyls, drying oils, and polysaccharides such as starches, guar, dextrins and alginates, and the like.

The amount of resin added to the metal oxide precursor pastes will depend on the application. A suitable amount of resin in accordance with the present subject matter is from about 1 wt % to about 15 wt % of the paste to attain a viscosity range for the paste from about 1000 to about 180,000 centipoise.

In accordance with one aspect of the present subject matter, the metal oxide precursor paste is applied by a screen printing process and the amount of resin in the paste is adjusted to achieve the desired viscosity of about 1000 to about 180,000 centipoise.

In another embodiment, the pastes of the present subject matter are tailored for digital printing. In this aspect, the amount of resin is adjusted to attain a viscosity ranging from about 1 to about 400 centipoise.

In another embodiment, the amount of resin in the paste is adjusted for roll coating. The paste(s) is modified with an amount of resin to attain a viscosity ranging from about 100 to about 25,000 centipoise.

The methods in accordance with the present subject matter generally comprise the operation of depositing the metal oxide precursor paste on at least a portion of the substrate. By "depositing" it is meant applying, disposing, layering, coating, or the like, that is a general term to indicate the action of putting the metal oxide precursor paste in contact with at least a portion of the substrate and is not meant to limit the operation to a specific means. The metal oxide precursor pastes of the present subject matter are capable of being applied to at least a portion of a substrate with many varied techniques. A particular benefit of the present pastes is that the viscosity and components of the pastes are capable of being tailored for each specific application strategy.

In a one aspect of the present subject matter, the metal oxide precursor paste is applied to at least a portion of a substrate by screen printing. Screen printing is a coating technique that uses a fine mesh or screen with blank areas coated with an impermeable substance. Normally, a coating material is forced into the openings of the mesh by a fill blade or squeegee and onto the substrate surface during the squeegee stroke, thus coating at least a portion of the substrate. Screen printing allows for relative inexpensive coverage of large surface areas of a substrate. Screen printing also allows for shapes, designs, lettering, logos, or the like to be applied to a substrate. In the screen printing application, the paste must sit on the screen and not drip though the screen until the squeegee applies pressure and shear to the coating material. The viscosity range for the paste for this type of application technique is from about 1000 to about 180,000 centipoise. In accordance with one aspect of the present subject matter, the metal oxide precursor paste is applied by a screen printing process where the metal oxide precursor paste is forced into the mesh openings to coat at least a portion of a substrate. The amount of resin in the paste is adjusted to achieve the desired viscosity of about 1000 to about 180,000 centipoise. The mesh size used for screen printing in accordance with the present subject matter is in the range from about 230-Mesh/inch (90 threads/cm) to about 600-Mesh/inch (236 threads/cm). The paste is applied by screen printing with a wet thickness of about 3 microns to about 100 microns.

In another embodiment, the pastes of the present subject matter are tailored for and applied to at least a portion of a substrate by digital printing. In this aspect, the paste is capable of being forced through small nozzles and onto at least a portion of a substrate. The amount of resin is adjusted to attain a viscosity ranging from about 1 to about 400 centipoise.

In another embodiment, the amount of resin in the paste is adjusted for and applied to at least a portion of a substrate by roll coating application techniques. The paste(s) is modified with an amount of resin to attain a viscosity ranging from about 100 to about 25,000 centipoise. At this viscosity the paste remains on the roll until the roll touches at least a portion of the substrate, transferring the paste to the substrate.

In accordance with the present subject matter, the present pastes can be modified for, and applied to at least a portion of a substrate by other application techniques such as curtain coating, band coating, spray coating, ink jet printing/coating, brush coating, dip coating, drip coating, spin coating, pad printing or the like. The present subject matter also contemplates combinations of different application techniques to a single substrate. The amount of resin can be tailored in accordance with the present subject matter for these specific application techniques.

In accordance with the present subject matter, the pastes can provide complete or partial coverage on a portion of a substrate. The pastes can be applied in almost any variety pattern, design, or logo. It is also contemplated that pastes with the same or differing refractive index can be applied in partial or full overlapping patterns or designs as required by a particular application. It is also contemplated that the pastes can be applied to at least portions of multiple sides of a substrate. The wet thickness at which pastes are disposed on the substrate will depend on the desired results. Pastes can be applied at lower wet thicknesses when higher loads of soluble metal complexes are used. Pastes that are disposed too thickly can result in optically opaque fired coatings. A wet coating that is too thick can also result in bubbled, curled, peeled, or otherwise non-planar fired coatings. A thickness of the wet pastes before drying and firing in accordance with the present subject matter is from about 3 microns to about 100 microns.

Additionally, the pastes of the present subject matter may optionally include additives generally known in the art to improve dispersability, wetting, flow and rheology, and to relieve surface defects. Pastes in accordance with the present subject matter can incorporate these additional components depending on the intended application. Non-limiting examples of typical additives include coloring agents, dispersants, surfactants, viscosity adjusting agents, flow controllers, stabilizers, co-solvents such as alcohols, and clarity promoters to promote maintenance of optical characteristics of the marking compositions. As noted, the use of one or more additives in the marking composition(s) is optional. The amount of additive(s) added to the metal oxide precursor pastes will depend on the application.

In the simplest embodiment in accordance with the present subject matter, a soluble metal complex is dissolved in one or more solvents. In another embodiment in accordance with the present subject matter, the solvent has the dual role of solvating the soluble metal complex and any resins or additives used. The solvent chosen to dissolve the soluble metal complex varies according to the chemical composition of the complex, the salt in which the metal ion is found, and the final intended application method to be used. The solvent can be non-polar or polar, including water. In one aspect in accordance with the present subject matter, suitable solvents include alcohols, polyols, members of the glycol and glycol ether families, carboxylic acids such as formic, acetic, propanoic, butanoic and glycolic acids and the like. Others sutiable for solvating metal alkoxides such as TEOS (tetra ethyl orthosilicate), TIP [Titanium(IV) isopropoxide] and Zirconium(IV) n-propoxide, are solvents such as alcohols, glycols and glycol ethers. The amount of solvent added to the metal oxide precursor paste will depend on the application. The amount of solvent will affect the drying rate, solubility of all the components of the paste, and the viscosity of the paste. In accordance with the present subject matter, a suitable amount of solvent for the metal oxide precursor pastes is from about 50 wt % to about 98 wt % of the pastes.

There are two main methods of creating a gradient index-of-refraction layer in accordance with the present subject matter. In a first embodiment, herein called a "coating gradient", the method includes applying successive coating layers of metal-oxide precursor pastes to a substrate. The successive coatings form a single transitional layer having a gradient index of refraction. Each successive coating contains metal-oxide precursors such that the index-of-refraction of each fired coating successively increases or decreases as the transitional layer is built up.

In one method described herein, the resultant transitional layer has no distinct internal boundaries between the successive coatings having varying indices of refraction. That is, the successive coatings intermix to form one unitary layer that does not exhibit hard or definite demarcations/boundaries between the portions of the layer with varying indices of refraction. If the boundaries between the successive coatings remain discrete, it is likely that the system would experience reflection losses. To avoid reflection loss, and in accordance with the present subject matter, the coatings are blurred with adjacent coatings so that reflection loss is limited. Therein, distinct boundaries between the coatings are substantially reduced.

Without being bound to any particular theory, it is believe that blurring the boundaries of successive coatings of metal-oxide precursor pastes that comprise metal-oxide precursors, an organic vehicle, and scattering particles, is achieved by "chemical inter-mixing" and/or "physical inter-mixing."

It is believed that chemical inter-mixing generally occurs at temperatures at and a little above room temperature, before organic burnout of the vehicle transpires in the metal-oxide precursor pastes and before the metal-oxide precursor oxidizes to form a transparent metal-oxide. In this type of inter-mixing, a transitional layer is built up with a plurality of coatings, between the first medium and a second medium having different indices of refraction. First, a "coating 1" paste is applied to the first medium and dried. The coating 1 paste would possess the metal-oxide precursors that would yield the refractive index substantially equal to, or as close as possible to the refractive index of the first medium. Next, a "coating 2" paste would be applied over the coating 1 paste. The coating 2 paste possesses the precursors necessary to yield a refractive index between that of the coating 1 paste and that of the second medium, whether it is higher or lower than the coating 1 paste.

In this embodiment, the pastes are generally miscible with each other. Therefore, the solvents in the coating 2 paste will partially dissolve the underlying dried coating 1, allowing the metal-oxide precursors in the two pastes to mix with each other at their common boundary. The coating 2 paste is then dried to prevent further inter-mixing. The penetration depth of the solvents from the coating 2 paste into the coating 1, and the related amount of intermixing of metal-oxide precursors, will depend on the proportion of solvent present in the coating 2 paste, the time before the coating 2 paste is dried, and other factors that can be tailored for specific desired results. Thereafter, a coating 3 paste can be applied to the dried coating 2 and so on, until the a last coating paste is applied that has the precursors necessary to produce a refractive index substantially equal to, or as close as possible to that of the second medium.

Upon firing of the multiple coating pastes, a single unitary gradient transitional layer is formed when the blurred boundaries of the coatings will be set in place. Of course, there is a limit to the number and thickness of the coatings that can be applied and fired at once. If too many coatings and/or too thick of a coating is applied, the coating and/or the built up transitional layer will tend to curl up from the substrate or form a loose powder on the substrate.

While not being bound to any particular theory, it is believed that physical inter-mixing between the coatings is most likely due to coating porosity. Physical inter-mixing is believed to occur at higher temperatures, where organic burnout is proceeding and oxidation of the metal-oxide precursor is occurring and the oxide layers begin to densify. Studies have shown that for the instant embodiment, this temperature range is approximately 325° C. to 525° C.

In this case, the successive coatings are applied to the substrate and each heated into the noted range of temperatures. The organic components in each coating begin to burn out and the metal-oxide precursors begin to oxidize at the lower end of the range, leaving behind a slightly porous metal-oxide film. If the firing is stopped before the oxide film is fully formed/densified, then the coating will contain small pores rather than being a smooth coating. In this process the coating is cooled and the next layer printed thereon.

The subsequently printed coating will be able to partially penetrate into the pores of the coating below, wherein the oxide precursors of the subsequently printed paste will intermingle with the partially oxidized underlying coating, thus blurring the index of refraction between the two coatings. Again, the subsequently printed paste is thereafter heated from about 325° C. to about 525° C. to form another slightly porous coating. These operations are repeated for any paste applied thereafter. After all coatings have been applied and during the final fire of the built up transitional layer, the blurred refractive index between the coatings will be set. During the final firing, which reaches temperatures higher than from about 325° C. to about 525° C., the slightly porous coatings will substantially densify. Therein, the metal-oxide precursors will substantially oxidize, leaving a substantially uniformly smooth transitional layer that is substantially free of pores and comprises transparent metal-oxides. The inter-mixed coatings will form a single transitional layer having a gradient index of refraction with boundaries between the coatings being substantially blurred.

In these aspects that produce a gradient index of refraction transitional layer, the coatings are applied by screen printing, digital ink-jet printing, spray-coating, roll-coating, rod-coating, curtain coating, dip-coating, pad-printing and the like.

In another aspect, the individual layers of the transitional layer remain substantially distinct from one another. In this aspect the method includes depositing, drying, and firing operations for each layer that will be completed for before a subsequent layer is applied. The firing of the previous layer before application of a subsequent layer reduces migration, mixing, or intermingling of separate layers that may or may not have different refractive indices.

Multi-layered transitional layers can be tailored to produce light extracting properties and light reflecting properties. By light extracting, it is meant the property of the transitional layer that increases transmission of light therethrough. The reflective properties can be tailored to be wavelength specific. For example, the coatings can be tailored to reflect UV-A, UV-B, visible light, or combinations thereof.

In another embodiment, the method includes forming a gradient index-of-refraction coating on a first medium by continuously varying the index of refraction as the transitional layer is built up between the first and a second medium. This is herein referred to as a "composition gradient". In one aspect, the method includes digitally ink-jet printing the continuously varied index of refraction coating on the first medium to build up the gradient transitional layer.

In this method, the transitional layer is built up digitally in a composition gradient, rather than a coating gradient, so as to transition between the index of refraction of the first medium to the index of refraction of the second medium. In this embodiment, the gradient (i.e. the change in concentration of the metal-oxide precursors) is adjusted by varying the concentration of the metal-oxide precursor in the metal-oxide precursor paste as the paste is built up through the thickness of the transitional layer. That is, a portion of the transitional layer closest to the interface with the first medium has a different ratio of metal-oxide precursor than a portion of the transitional layer furthest from the interface with the first medium (i.e. closest to the interface with the second medium), with the ratio being continuously increased or decreased between the two portions.

If the index of refraction of the first medium is greater than the second, then the proportion of high-index metal-oxide precursors in the transitional layer is higher in a portion of the transitional layer near the interface with the first medium, and lower in a portion of the transitional layer near the interface with the second medium. If the index of refraction of the first medium is less than the second, then the proportion of high-index metal-oxide precursors in the transitional layer is lower in a portion near the interface with the first medium, and higher in a portion near the interface with the second medium.

In this method, the high-index metal-oxide precursor concentration is continuously varied in the paste during printing to form a transitional layer having a gradient index of refraction that has been continuously adjusted between different portions of the transitional layer during printing. Once printed, the coating is fired to set the gradient index of refraction in the transitional layer.

Ink jet printing techniques require lower viscosity inks than are required with screen printing. Low viscosity inks have lower amounts of resin to burn away and therefore, it may be possible to produce thicker layers of finished oxide coatings.

Combination Gradient Transitional Layer Having Scattering Particles

A gradient transitional layer of the present subject matter can be combined with the incorporation of scattering particles, either therein or as a separate layer, to further enhance light transmission efficiency from one medium to another. A simple additive process for the scattering particles into the gradient coatings, or a simple addition of another separate layer comprising scattering particles disposed near the gradient coating, can produce this combination. Likewise, a crystalline particle forming process, as disclosed herein, can be combined with the gradient coating to produce an efficient light transmitting transitional layer.

In one embodiment, the scattering particles are included in the gradient coatings used to build up the transitional layer. In one aspect of this embodiment, the scattering particles contained in each gradient coating used to build up the transitional layer, have an index of refraction less than each respective gradient coating in which they are contained. In another aspect, the scattering particles contained in each gradient coating used to build up the transitional layer, have an index of refraction more than each respective gradient coating in which they are contained. In still another aspect, the scattering particles contained in each gradient coating used to build up the transitional layer, have an index of refraction that is either more or less than each respective gradient coating in which they are contained.

In another embodiment, the scattering particles are included in a separate layer from the gradient transitional layer.

EXAMPLES

The following examples are intended only to illustrate the invention and should not be construed as imposing limitations upon the claims.

Scattering Layer Examples

Example 1

200 g of S403 Frit (SRRG), an experimental, lead-free frit at Ferro Corporation, was weighed into a casserole pan. 2 g of 85% phosphoric acid was weighed into a separate beaker and approximately 15 g of DI water was added. The acid solution was stirred together with a glass rod and was then poured over the glass powder. Thick slurry was formed by the addition of more water and stirring. The casserole pan was then placed in a force drier at 86° C. to dry. The powder was loosened with a spatula part way through the drying process to ensure complete drying. After drying, the powder was sieved through a 325-Mesh screen before use.

Example 2

A comparative example was prepared with 15 g of the sieved frit from Example 1 and 4 g of C92 Medium, available from Ferro Corporation, which were weighed onto a glass pane and mulled together with a spatula to form a paste. The paste was printed through a 420-Mesh screen onto a substrate, which consisted of several panes of soda lime glass. The glass was placed on a hotplate to dry. After drying, the glass was placed on an alumina plate and the alumina plate was in turn placed on a wire mesh. This set-up was placed in a furnace set at 400° C. and heated for 10 minutes. This step is considered the "pre-heat," wherein before the glass particles begin to soften, the C92 medium acting as an organic carrier, is burned out of the paste leaving only the glass particles. Next, the set-up was fired at 575° C. for 7.5 minutes. This second heating step is considered "the firing step", wherein the glass particles melt. After firing, the set-up was cooled, which produced a transparent and smooth film coating on the glass panes. This coating has a high index-of-refraction, at approximately 2.1. See Table 1 herein showing data related to the optical characteristics of this Example 2, as well as for Examples 3-6.

Example 3

The procedure for preparing comparative Example 3 was the same as for preparing Example 2, except that the firing temperature was raised to 600° C. This fired film is also transparent and smooth. See Table 1.

Example 4

The procedure for preparing comparative Example 4 was the same as for preparing Example 2, except that the firing temperature was raised to 625° C. This fired film is also relatively transparent and smooth. See Table 1.

Example 5

The procedure for preparing Example 5, which is a light scattering layer in accordance with the present subject matter, was the same as for preparing Example 2, except that the firing temperature was raised to 650° C. This fired film differs from the others in that it is hazy in appearance. The surface of the coating appears more matte in appearance than comparative Examples 2-4. See Table 1.

Example 6

A light scattering layer in accordance with the present subject matter was prepared with 9 g of E-8047 AM Frit, 1 g of EG-0225 Modifier and 5 g of C92 medium (all available from Ferro Corporation), weighed onto a glass plate and mulled together with a spatula until a smooth, homogenous paste was generated. E-8047 is a frit that fires to give a translucent coating on glass. The EG-0225 is an additive that is added to provide scattering in the film and is also useful for lowering the expansion of the enamel. The paste was printed through a 230-Mesh screen onto soda-lime glass and the glass was placed on a hotplate to dry. After drying, the printed glass was pre-heated at 425° C. for 5 minutes and then fired at 635° C. for five minutes to yield a rough, light scattering layer on the glass.

The paste of Example 1 was then printed on top of this rough light scattering layer and the print was dried. The glass was pre-heated at a 400° C. for 10 minutes and then fired at 600° C. for ten minutes. After this firing operation, the transparent coating from Example 1 had softened and flowed into the rough scattering layer. The surface of the coating is glossy, with millimeter-scale waviness.

Again referring to Table 1, comparative Examples 2-4 display little scattering, showing low % Haze values. Light scattering Example 6 shows a massive amount of scattering, since the % Haze value is so high and the % Clarity value is low. Example 6 maintains relatively high transmission, indicating that a large portion of the light is passing through the sample, but is being scattered in the process. Light scattering Example 5 shows a moderately high amount of scattering, since the % Haze is 41.0% while maintaining high transmission of 84.2%, which is similar to comparative Examples 2-4 which exhibit little scattering.

TABLE 1

Optical Data for Examples 2-6.

| Example | % Transmission | % Haze | % Clarity |
| --- | --- | --- | --- |
| Substrate Glass | 91.1% | 0.40% | 100% |
| Example 2 | 83.4% | 2.41% | 99.3% |
| Example 3 | 85.3% | 1.51% | 99.4% |
| Example 4 | 84.7% | 4.00% | 98.9% |
| Example 5 | 84.2% | 41.0% | 91.2% |
| Example 6 | 80.2% | 101% | 5.30% |

Gradient Index-of-Refraction Layer Examples

Example 7

Paste Preparation 385 g of Dowanol DB (available from Dow Chemical) was weighed into a 600 ml beaker. The contents of the beaker were set stirring with a high speed mixer. 15 g of Klucel L (available from Hercules, Aqualon Division) was added to the solvent mixture under shear. The contents of the beaker were stirred to dissolve the Klucel. After the Klucel dissolved, the solution was stored in an amber bottle for use. This is considered the "thinner" stock solution.

92.04 g of Dowanol DB (available from Dow Chemical) was weighed into a beaker. The contents of the beaker were set stirring with a magnetic stir bar. 3.74 g of Klucel L (available from Hercules, Aqualon Division) was added to the solvent under shear. The contents of the beaker were stirred and heated to dissolve the Klucel. The beaker was then moved to a tap water bath and stirred further to cool the solution. After cooling the solution to room temperature, 1.56 g of deionized water and 0.112 g of nitric acid (65%, available from Fisher Scientific) were added. The solution was stirred further to dissolve the new components. Next, 2.633 g of TEOS (tetra-ethyl orthosilicate, available from Aldrich) was added to the stirring solution and dissolved. The solution was stirred overnight and then was stored in amber jar. This is considered the "low-index" stock solution.

84.97 g of Dowanol DB (available from Dow Chemical) was weighed into a beaker. The contents of the beaker were set stirring with a magnetic stir bar. 3.76 g of Klucel L (available from Hercules, Aqualon Division) was added to the solvent under shear. The contents of the beaker were stirred and heated to dissolve the Klucel. After the Klucel had dissolved, 11.45 g of Tyzor TEAZ, available from Dorf-Ketal, was added to the solution. The solution was stirred overnight and then poured into an amber jar for storage. This is the "high index" stock solution.

32.89 g of the low-index stock solution and 67.11 g of the thinning solution were weighed into a beaker and stirred together with a magnetic stirrer. This is Paste A, the working low-index paste. It is designed to provide approximately 0.25 g of $SiO_2$ for every 100 g of paste printed.

25.37 g of the high-index stock solution and 74.62 g of the thinning solution were weighed into a beaker and stirred together with a magnetic stirrer. This is Paste F, the working high-index paste. It is designed to provide approximately 0.513 g of $ZrO_2$ for every 100 g of paste printed, and then fired. At these ratios of $SiO_2$ and $ZrO_2$ in each of the respective pastes A and F, equal weights of the two pastes combined will give approximately a 1:1 molar ratio of Si:Zr in the fired film.

Four intermediate-index pastes were formulated by mixing varying ratios of Paste A and Paste F, as noted in Table 2.

TABLE 2

Paste Formulations for Example 7

| Paste | Grams of Paste A | Grams of Paste F |
|---|---|---|
| Paste A (100% $SiO_2$ fired film) | 10.00 g | 0.00 g |
| Paste B (80% $SiO_2$/20% $ZrO_2$) | 8.02 g | 2.01 g |
| Paste C (60% $SiO_2$/40% $ZrO_2$) | 6.01 g | 4.07 g |
| Paste D (40% $SiO_2$/60% $ZrO_2$) | 4.01 g | 6.01 g |
| Paste E (20% $SiO_2$/80% $ZrO_2$) | 2.00 g | 8.14 g |
| Paste F (100% $ZrO_2$ fired film) | 0.00 g | 10.00 g |

Example 8

Single Paste Prints on Glass

Each paste A through F was printed on a 3"×3"×3 mm pane of soda-lime glass. The pastes were printed through a 500-Mesh/inch nylon screen. After printing, the panes were placed on a hotplate and heated until the paste was dry. After drying, the panes were placed on a 3"×3"×1 mm sheet of alumina. The alumina was placed on a wire mesh and the set-up was pre-heated at 400° C. for five minutes. The set-up was then fired at 575° C. for five minutes. The set-up was moved to a bench top. After cooling for 90 seconds, the pane was moved under a stream of compressed air and held there until the glass was cool to the touch. Each of the six panes was subjected to optical measurements.

Example 9

Gradient Coating—High Fire Temperature

Paste A was printed on a pane 3"×3"×3 mm pane of soda-lime glass through a 500-Mesh/inch nylon screen. The pane was dried on a hotplate. After drying, the pane was placed on a 3"×3"×1 mm alumina plate. The plate was placed on a wire mesh and pre-heated at 400° C. for 5 minutes and then fired at 575° C. for five minutes. After firing, the pane was cooled as described in Example 8. After cooling, Paste B was applied over fired Paste A and fired in the same manner as Paste A. Pastes C through F were then applied, in sequential order, over the film in the same manner as Paste B.

This coating is likely to be the most "layered" of the coatings described in Examples 9-11. In other words, the coating will have layers that are substantially distinct from one another having distinct boundaries between the layers A-F. While not being bound to any particular theory, it is believed that the layered nature of this example results from a high firing temperature, wherein the individual oxide films reach their highest density before the next paste is applied, thus inhibiting intermixing of the oxides between the layers.

Example 10

Gradient Coating—Low Fire Temperature

Paste A was printed on a pane 3"×3"×3 mm soda-lime glass through a 500-Mesh/inch nylon screen. The pane was dried on a hotplate. After drying, the pane was placed on a 3"×3"×1 mm alumina plate. The plate was placed on a wire mesh and fired at 400° C. for 5 minutes. After firing the pane was cooled as described in Example 8. After cooling, Paste B through F were applied sequentially and fired in the same manner. The same print/dry/fire/cool cycle was used to apply Pastes A through E to the glass. After applying Paste F, the pane was dried on the hotplate as described. The pane was fired at 400° C. for 5 minutes and then at 575° C. for five minutes, in order to fully fire the coating. The fired coating was brown in color through the intermediate steps, indicating that some carbon was still trapped in the coating before the 575° C. heating step.

This coating is likely more "physically mixed" than the coating of Example 9. In other words, the coating will have layers that are less distinct from one another having blurred boundaries between the layers A-F. While not being bound to any particular theory, it is believed that the physically mixed nature of this example results from a firing temperature between the application of each layer that is lower than in Example 9, wherein the individual oxide films have a lower density and retain some porosity and carbon, allowing subsequently printed pastes to partially penetrate the film below.

Example 11

Gradient Coating—One Firing Step

Paste A was printed on a pane 3"×3"×3 mm soda-lime glass through a 500-Mesh/inch nylon screen. The pane was dried on a hotplate. After drying, the pane was cooled on the bench top. After cooling, Pastes B-F were applied and dried in the same manner. The same print/dry cycle was used to apply Pastes A through F to the glass. After applying Paste F, the pane was dried on the hotplate as described. The pane was then fired at 400° C. for 5 minutes and then at 575° C. for five minutes, in order to fully fire the coating.

this coating is likely the most mixed coating of Examples 9-11. The printed pastes are only dried on a hotplate between prints. While not being bound to any particular theory, it is believed that the mixed nature of this coating results from the wet printed paste applied on top of the dried film below partially dissolving the print below, resulting in some "chemical mixing" of the paste layers.

Example 12

Comparative, High-Index Coating

Paste F was printed on a pane 3"×3"×3 mm soda-lime glass through a 500-Mesh/inch nylon screen. The pane was dried on a hotplate. After drying, the pane was cooled on the bench top. After cooling, Paste F was again applied and dried in the same manner. After applying a third print of Paste F, the pane was dried on the hotplate as described. This time, the pane was fired at 400° C. for 5 minutes and then at 575° C. for five minutes, in order to fully fire the coating. Three more prints of Paste F were applied to the glass and fired as described above.

This coating is likely the most reflective of the Examples 9-12. The highest contrast in refractive indices between the glass substrate and the coating occurs in this Example. One print of a coating with the correct concentration of metal oxide precursor should result in the same thickness of fired film. In this case, six prints were used in order to mimic the process used to make Examples 9-11.

Figure 11:
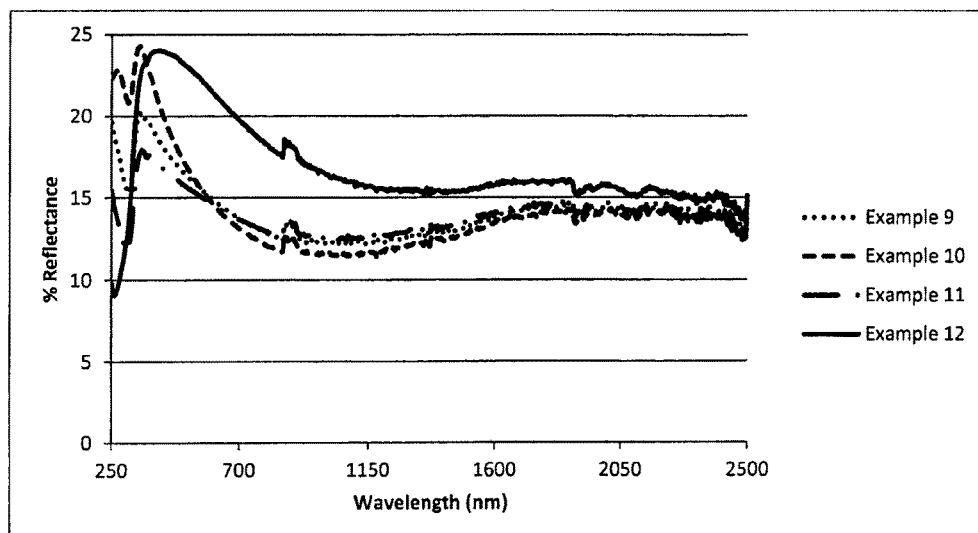
FIG. 11 is a graph showing percent reflectance data for several examples of light influencing nano-layers made in accordance with the present subject matter, and one comparative example.

Referring to FIG. 11, it will be seen that % Reflectance for Examples 9-11 is less than that seen for Comparative Example 12. The sample with the lowest reflection is Example 11 since the layers have the most opportunity to mix together during the printing and drying cycles. The surface chemistry of all of the examples should be the same, since the paste with the highest refractive index was printed last in each case. FIG. 11 depicts the % reflectance data for Comparative Examples 12 and Inventive Examples 9-11.

Figure 12:
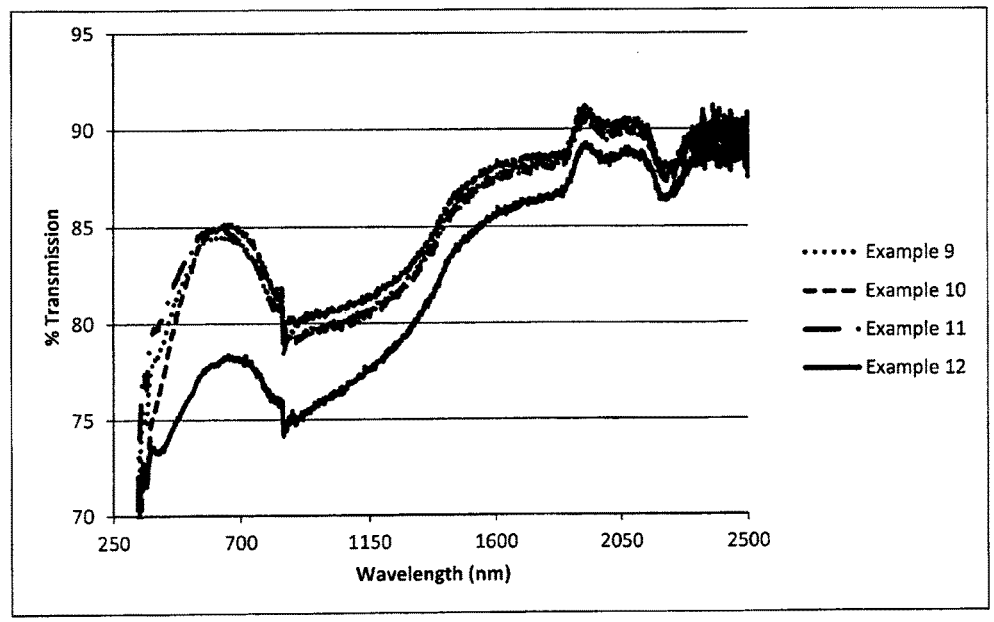
FIG. 12 is a graph showing percent transmission data for the examples of FIG. 11.

Referring to FIG. 12, it is seen that the % Transmission for Comparative Example 12 is lower than for the Examples 9-11. The % Transmission is most likely lower for Comparative Example 12 due to reflection loss. FIG. 12 depicts % transmission data for Comparative Example 12 and Inventive Examples 9-11.

Single Layer Examples

In the examples below, TLU-0050A is a paste consisting essentially of glycol ether, a miscible thickener, a titanium metal alkoxide. This paste fires to provide a high index of refraction, heat-stable coating consisting of titanium metal oxide on the substrate surface. RD-3424 is a similar glycol ether paste that fires to give a relatively low index-of-refraction coating on the substrate. After firing, this coating is also heat stable and consists of a silicon metal oxide. RD-3428 is a screen printable paste consisting essentially of glycol ether, a cellulose-base thickener, and a zirconium metal chelate. The result after firing at high temperature is a zirconium oxide film with relatively high index-of-refraction. RD-3429 is a paste consisting essentially of glycol ether, a cellulose-based thickener, and a silicon metal alkoxide. This paste fires to give a silicon metal oxide layer with a relatively low index-of-refraction, similar to RD-3424 above.

Example 13

The TLU-0050A paste was screen-printed with a 305-Mesh/inch nylon screen onto 1 mm thick substrate glass. The microscope slide had been previously washed in Alkanox detergent. The glass was fired flat on a metal mesh at 1100° F. for 2.5 minutes. After firing, the pane was cooled. The fired coating was a neutral gray in color and partially reflecting.

Example 14

16 g of TLU-0050A and 4 g of RD-3424 were weighed into a beaker and stirred with a glass rod. After stirring, the sample was poured into a 1 oz. jar. The jar was placed in a FlackTek mixer and mixed for 50 seconds at 2500 rpm. The resulting paste was screen-printed with a 305-Mesh/inch nylon screen onto 1 mm thick substrate glass. The microscope slide had been previously washed in Alkanox detergent. The glass was fired flat on a metal mesh at 1100° F. for 2.5 minutes. After firing, the pane was cooled. The fired coating was a neutral gray in color and partially reflecting.

Example 15

12 g of TLU-0050A and 8 g of RD-3424 were weighed into a beaker and stirred with a glass rod. After stirring, the sample was poured into a 1 oz. jar. The jar was placed in a FlackTek mixer and mixed for 50 seconds at 2500 rpm. The resulting paste was screen-printed with a 305-Mesh/inch nylon screen onto 1 mm thick substrate glass. The microscope slide had been previously washed in Alkanox detergent. The glass was fired flat on a metal mesh at 1100° F. for 2.5 minutes. After firing, the pane was cooled.

Example 16

8 g of TLU-0050A and 12 g of RD-3424 were weighed into a beaker and stirred with a glass rod. After stirring, the sample was poured into a 1 oz. jar. The jar was placed in a FlackTek mixer and mixed for 50 seconds at 2500 rpm. The resulting paste was screen-printed with a 305-Mesh/inch nylon screen onto 1 mm thick substrate glass. The microscope slide had been previously washed in Alkanox detergent. The glass was fired flat on a metal mesh at 1100° F. for 2.5 minutes. After firing, the pane was cooled.

Example 17

4 g of TLU-0050A and 16 g of RD-3424 were weighed into a beaker and stirred with a glass rod. After stirring, the sample was poured into a 1 oz. jar. The jar was placed in a FlackTek mixer and mixed for 50 seconds at 2500 rpm. The resulting paste was screen-printed with a 305-Mesh/inch nylon screen onto 1 mm thick substrate glass. The microscope slide had been previously washed in Alkanox detergent. The glass was fired flat on a metal mesh at 1100° F. for 2.5 minutes. After firing, the pane was cooled.

Example 18

The RD-3424 paste was screen-printed with a 305-Mesh/inch nylon screen onto 1 mm thick substrate glass. The glass was fired flat on a metal mesh at 1100° F. for 2.5 minutes. The microscope slide had been previously washed in Alkanox detergent. After firing, the pane was cooled. The fired coating was clear with no opacity but contained evidence of some bubbling during the printing and drying.

Example 19

Slides from Examples 13-18 were inspected. It was decided that Examples 13, 14 and 17 were suitable for spectroscopic ellipsometry (SE), the others having too many bubbles for valid measurements. The samples were shipped to the Univ. of Toledo (PVIC) for SE measurements and the analysis was done when the data was returned.

Figure 13:
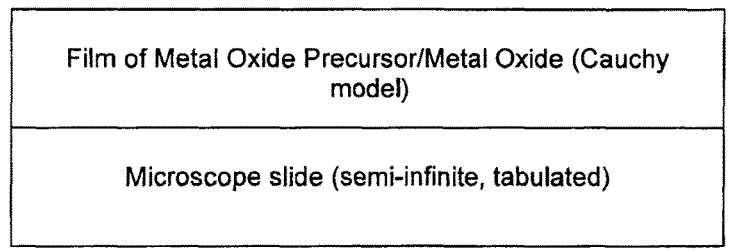
FIG. 13 is a schematic cross-sectional optical model used for analyzing examples of light influencing nano-layers.

It was decided to build a simple optical model consisting of a semi-infinite substrate with a single thin film layer (see FIG. 13) and report effective optical functions (n,k) in the transparent regime (k=0). The microstructure plays a key role in the optical properties of the films <400 nm (scattering and absorbing region, k>0) and further study will be necessary to report on this spectral region. FIG. 13 depicts an optical model used for these analyses.

Figure 14:
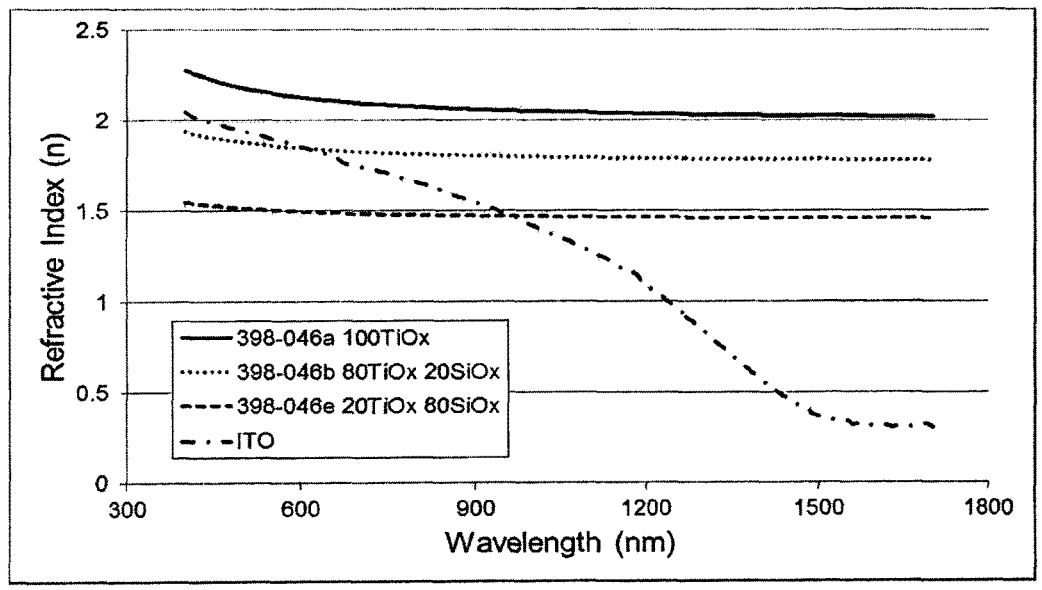
FIG. 14 is a graph showing a real part of index of refraction for mixture films made in accordance with the present subject matter and for a reference indium tin oxide film, and plotted in relation to wavelength of light.

The real part of the index of refraction for the three films is shown in FIG. 14. Note the dependence of (n) on the mixture composition. Also plotted is an example Indium Tin Oxide (ITO) index. The index of refraction (n) is a function of wavelength and not a single number value. FIG. 14 depicts a real part of index of refraction (n) of the mixture films plotted in relation to wavelength of light (nm) along with a reference ITO film. Note where k=0 in this spectral region (the films are transparent).

UV Reflectance Examples

Example 20

Figure 15:
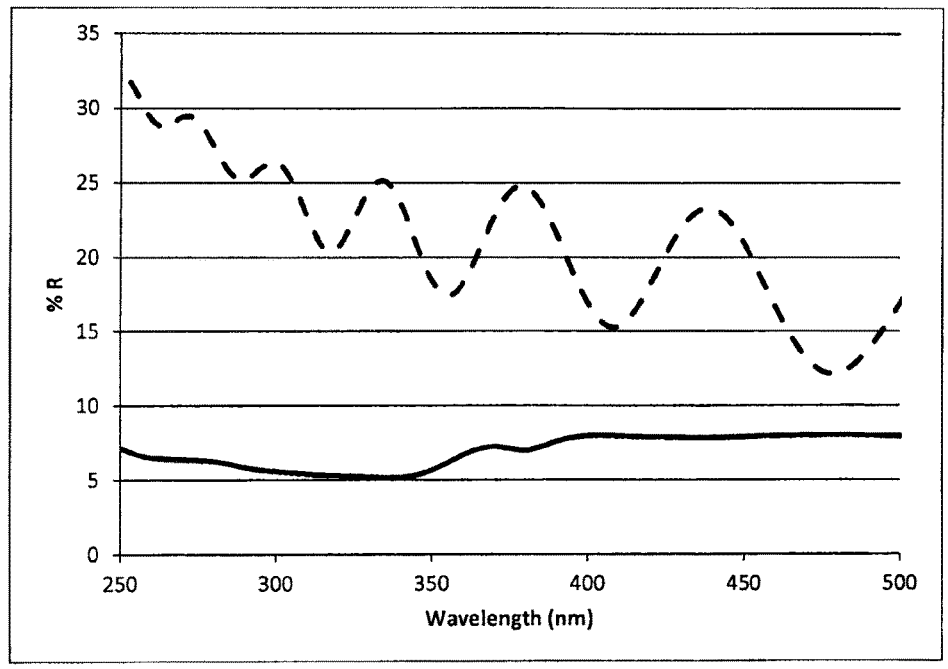
FIG. 15 is a graph showing percent reflectance data for an example of a light influencing nano-layer made in accordance with the present subject matter, and for a bare glass substrate.

A pane of PGW Solexia glass was washed in soap and water, rinsed with tap water and then with DI water and finally was dried with paper towels. RD-3428 was printed onto the glass using 420-Mesh screen. The pane of glass was placed on a hotplate and heated until the paste dried. The glass was removed from the hotplate and first placed on an oven mitt to cool. After cooling a few minutes on the oven mitt, the pane was moved to a laboratory bench top and allowed to cool to room temperature. Next, a 300-Mesh screen was set up so that its print would fall on top of the previous one. The pane was replaced in the screen print station and printed as before, this time using RD-3429. The pane was dried and cooled as above. The 420-Mesh screen was replaced in the print station and a third print was made, again using the RD-3428 paste. After drying the pane for the third time, the glass was fired for 5 minutes at 580° C. After cooling, the pane was subjected to UV-Vis-NIR spectroscopy. The % Reflectance spectrum, indicated in FIG. 15, showed that the coating reflected approximately 20% of the incident light in the UV-A region of the electromagnetic spectrum. There is nearly 20% contrast between the dashed and solid traces at approximately 375-380 nm. FIG. 15 depicts the Reflection spectra of the fired film of Example 20 (dashed trace) and the bare glass substrate (solid trace).

Example 21

The "high index" stock paste from Example 7 above was printed onto a 3"×3"×3 mm pane of glass through a 305-Mesh screen and dried on a hotplate. After drying, the pane was fired at 400° C. for five minutes and then at 575° C. for five minutes. The pane was removed from the furnace and cooled in air. The "low index" stock paste from Example 7 above was printed, dried, fired and cooled in the same manner. Finally, the "high index" paste was again applied in the same manner. This is a "3-print, 3-fire" multi-layer coating.

Example 22

Figure 16:
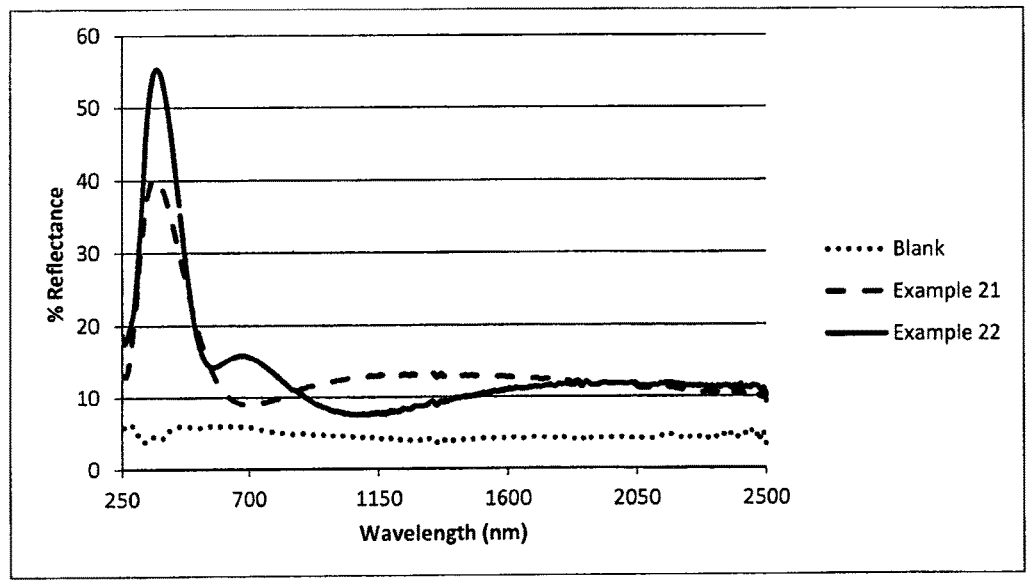
FIG. 16 is a graph showing percent reflectance data for two examples of light influencing nano-layers made in accordance with the present subject matter, and for a bare glass substrate.

A pane from Example 21 was treated once more with the "low index" pasted and then with the "high index" paste, to give a "5-print, 5-fire" multi-layer coating. The UV reflectance is expected to be increased in Example 22 over example 21 due to the added two interfaces. This expectation is borne out by the UV-Visible-NIR % Reflectance spectra, please see FIG. 16. FIG. 16 shows the % Reflectance spectra of a blank glass pane, a pane coated with a three-layer, UV-Reflective coating (Example 21) and a five layer, UV-Reflective coating (Example 22).

What is claimed is:

1. A method of forming a plurality of transitional layers with selectable indices of refraction on a substrate, the method comprising:
    providing a substrate and a plurality of metal oxide precursor pastes, wherein the plurality of metal oxide precursor pastes each include at least one soluble metal complex, a complex-forming agent, and a resin dissolved in a solvent, wherein the complex-forming agent replaces at least one ligand on the metal complex to provide a metal compound that is less likely than the metal complex to oxidize in the presence of water or oxygen;
    depositing each of the plurality of metal oxide precursor pastes on the substrate to form a plurality of coating layers; and
    heating each of the plurality of coating layers to burn off the solvent and the resin, and oxidize the at least one soluble metal complex to thereby form a plurality of transparent transitional layers of metal oxide situated on top of one another on the substrate.

2. The method of claim 1, wherein the plurality of transitional layers have increasing or decreasing index of refraction values going away from the substrate.

3. The method of claim 2, wherein:
    each of the plurality of coating layers are dried to remove at least a portion of the solvent before a subsequent one of the plurality of metal oxide precursor pastes are deposited on the substrate; and
    heating is performed after all of the plurality of metal oxide precursor pastes have been deposited on the substrate.

4. The method of claim 3, wherein the plurality of coating layers intermix such that the plurality of transitional layers do not have distinct boundaries between them and thereby define a single layer on the substrate.

5. The method of claim 2, wherein each of the plurality of coating layers are heated to burn off the solvent and the resin, and oxidize the at least one soluble metal complex before a subsequent one of the plurality of metal oxide precursor pastes are deposited on the substrate.

6. The method of claim 5, wherein the plurality of transitional layers have distinct boundaries between them.

7. The method of claim 1, wherein the plurality of transitional layers have alternating higher and lower index of refraction values going away from the substrate to thereby form a light reflective layer on the substrate.

8. The method of claim 6, wherein each of the plurality of transitional layers having the higher index of refraction values has a layer thickness of approximately ¼ the wavelength of UV-A, UV-B, or visible light.

9. The method of claim 7, wherein each of the plurality of transitional layers having the lower index of refraction values has a layer thickness more than each of the plurality of transitional layers having the higher index of refraction values.

10. The method of claim 1, wherein the at least one soluble metal complex comprises a metal alkoxide.

11. The method of claim 10, wherein the metal alkoxide is selected from the group consisting of metal methoxide, metal ethoxide, metal isopropoxide, metal butoxide, and combinations thereof.

12. The method of claim 10, wherein the metal in the metal alkoxide is selected from the group consisting of boron, aluminum, silicon, phosphorus, scandium, titanium, zinc, gallium, germanium, arsenic, yttrium, zirconium, niobium, molybdenum, indium, tin, antimony, lanthanum, hafnium, tantalum, tungsten, and combinations thereof.

13. The method of claim 10, wherein the metal alkoxide is selected from the group consisting of tetraethyl orthosilicate, titanium (IV) isopropoxide, zirconium (IV) n-propoxide, and combinations thereof.

14. The method of claim 1, wherein the resin comprises a water soluble resin.

15. The method of claim 1, wherein the solvent comprises an organic solvent.

16. The method of claim 1, wherein the complex-forming agent is selected from the group consisting of poly-acrylic acid, oxalic acid, maleic acid, succinic acid, dipropylene glycol, glymes, 1, 4 butane diol, 1, 3 butane diol, 1, 3 propane diol, pine rosin, citric acid, and combinations thereof.

17. The method of claim 1, wherein the plurality of metal oxide precursor pastes each have a viscosity of about 1000-180,000 centipoise and the depositing comprises screen printing.

18. The method of claim 1, wherein the metal oxide precursor paste has a viscosity of about 1-400 centipoise, and the depositing comprises digital printing.

19. The method of claim 1, wherein the metal oxide precursor paste has a viscosity of about 100-25,000 centipoise, and the depositing comprises roll coating.

* * * * *